United States Patent
Greden et al.

(10) Patent No.: US 9,448,841 B2
(45) Date of Patent: *Sep. 20, 2016

(54) DECOMMISSIONING PHYSICAL HOST MACHINES AFTER RELOCATING UNPRODUCTIVE VIRTUAL MACHINES THEREFROM

(71) Applicant: CA, INC., Islandia, NY (US)

(72) Inventors: Lara Virginia Greden, Reston, VA (US); Peter James Gilbert, Teaneck, NJ (US); James B. Mercer, Millville, MA (US); Richard John Wcislicki Lankester, Ottawa (CA); Dhesikan Ananchaperumal, Shrewsbury, MA (US); John Wiley Ashby, Jr., Austin, TX (US); Salvatore Pilo, Smithtown, NY (US); Francois Marie Bruno Cattoen, Newton, MA (US); Paul David Peterson, Round Rock, TX (US)

(73) Assignee: CA, Inc., New York, NY (US)

( * ) Notice: Subject to any disclaimer, the term of this patent is extended or adjusted under 35 U.S.C. 154(b) by 142 days.

This patent is subject to a terminal disclaimer.

(21) Appl. No.: 14/215,995

(22) Filed: Mar. 17, 2014

(65) Prior Publication Data
US 2015/0261574 A1     Sep. 17, 2015

(51) Int. Cl.
*G06F 9/455*     (2006.01)
*G06F 9/50*      (2006.01)

(52) U.S. Cl.
CPC ............. *G06F 9/50* (2013.01); *G06F 9/45558* (2013.01); *G06F 9/45545* (2013.01); *G06F 2009/4557* (2013.01); *G06F 2209/503* (2013.01)

(58) Field of Classification Search
None
See application file for complete search history.

(56) References Cited

U.S. PATENT DOCUMENTS

| 6,847,856 | B1 * | 1/2005 | Bohannon ..................... 700/115 |
| 7,765,286 | B2 | 7/2010 | Mark |
| 2008/0123559 | A1 * | 5/2008 | Haviv et al. .................. 370/255 |
| 2009/0106571 | A1 * | 4/2009 | Low et al. .................... 713/310 |

(Continued)

OTHER PUBLICATIONS

Patil, VirtPerf: A Performance Profiling Tool for Virtualized Environments, 2011 IEEE 4th International Conference on Cloud Computing, pp. 57-64.*

(Continued)

*Primary Examiner* — Lewis A Bullock, Jr.
*Assistant Examiner* — Bruce S Ashley
(74) *Attorney, Agent, or Firm* — Myers Bigel & Sibley, P.A.

(57) ABSTRACT

A resource management node includes a processor and a memory coupled to the processor. The memory includes computer readable program code that when executed by the processor causes the processor to perform operations. The operations can include identifying an unproductive group of guest virtual machines (VMs) that satisfy a defined rule for being unproductive on an first group of physical host machines based on infrastructure of a distributed computing system used by the first group of the physical host machines to host the guest VMs. A relocation scenario is generated for relocating the unproductive group of the guest VMs from the first group of the physical host machines to a second group of the physical host machines. An effect of the relocation scenario on infrastructure usage of the distributed computing system is estimated. The unproductive group of the guest VMs is relocated from the first group of the physical host machines to the second group of the physical host machines based on the relocation scenario.

14 Claims, 17 Drawing Sheets

(56) References Cited

U.S. PATENT DOCUMENTS

| | | | |
|---|---|---|---|
| 2009/0138313 A1* | 5/2009 | Morgan et al. | 705/8 |
| 2011/0077795 A1* | 3/2011 | VanGilder | G06F 1/206 700/300 |
| 2011/0289345 A1* | 11/2011 | Agesen et al. | 714/4.11 |
| 2013/0042234 A1* | 2/2013 | DeLuca et al. | 718/1 |
| 2014/0040899 A1* | 2/2014 | Chen et al. | 718/102 |

OTHER PUBLICATIONS

Azevedo et al.; "The Green Grid Data Center Compute Efficiency Metric: DCcE"; The Green Grid, White Paper #34, Copyright 2010; 15 pages.

* cited by examiner

Before Implementation of
VM Placement Scenario

After Implementation of
VM Placement Scenario

Recursively determine an amount of electrical power capacity of the cabinets, cooling capacity of the cabinets, and/or physical rack storage space of the cabinets used by the plurality of different placements of the physical host machines in the cabinets of the distributed computing system to identify one of the plurality of different placements that satisfies a defined rule for how much electrical power capacity of the cabinets, cooling capacity of the cabinets, and/or physical rack storage space of the cabinets is allowed to be used ⟵ 1700

FIGURE 17

Guest VM Relocation Scenario Information

| Guest VM Identifier | Guest VM Characteristics | First (Present) Group of Physical Host Machines | Second (Destination) Group of Physical Host Machines |
|---|---|---|---|
| | | | |
| | | | |
| | | | |
| | | | |
| | | | |

FIGURE 19

Physical Host Machine Decommissioning Work Order Information

| Cabinet Identifier | Rack/Location Identifier | Physical Host Characteristic (e.g., Model) | Network Address | Network Physical Port | Power Physical Port |
|---|---|---|---|---|---|
| | | | | | |
| | | | | | |
| | | | | | |
| | | | | | |
| | | | | | |

FIGURE 20

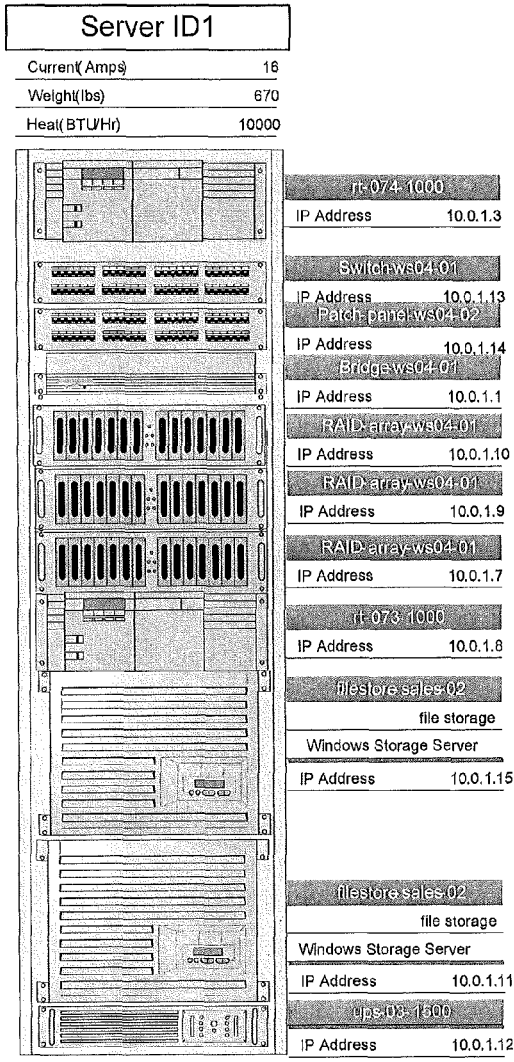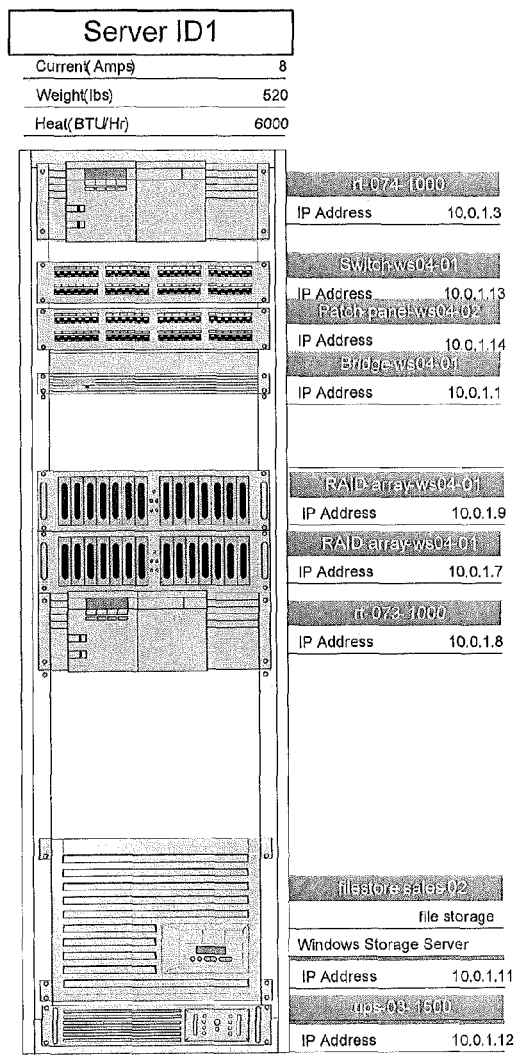
Before Decommissioning of Physical Host Machines Based on Relocation Scenario
FIGURE 21
After Decommissioning of Physical Host Machines Based on Relocation Scenario
FIGURE 22

DECOMMISSIONING PHYSICAL HOST MACHINES AFTER RELOCATING UNPRODUCTIVE VIRTUAL MACHINES THEREFROM

BACKGROUND

The present disclosure relates to computer systems, and in particular to controlling deployment of resources within a distributed computing system.

Distributed computing systems, sometimes also referred to as cloud computing systems, are used to provide services to electronic devices which may be operated by end users. In a cloud computing system, the physical host machine architecture is hidden from the end user. The physical host machines can include servers, network storage devices, computing devices, network routers, network gateways, wireless/wired network interface devices, etc. However, because services are deployed on a physical host machine architecture which is hidden from end users, it can be managed, upgraded, replaced or otherwise changed by a system administrator (operator) without the end users being aware of or affected by the change.

In existing cloud and other distributed computing systems, the creator of services or the operator of the cloud system must know in advance which applications (or types of applications) will be deployed and estimate the number and types of physical host machines that need to be deployed in the cloud system to support processing of the applications. The capacity of the distributed computer system can be changed by increasing or decreasing the number or types of physical host machines. During operation, a load balancer can operate to direct requests from user electronic devices to particular ones of the physical host machines for processing by associated applications. Although load balancers can provide better balancing of system utilization, they may not sufficiently improve the efficiency at which physical host machines are deployed and used, which may have a substantial effect on cost in view of the potential large number of physical host machines and applications that can be deployed in some distributed computer systems.

SUMMARY

An embodiment disclosed herein is directed to a method of operating a resource management node. An unproductive group of guest VMs is identified that satisfy a defined rule for being unproductive on an first group of physical host machines based on infrastructure of a distributed computing system used by the first group of the physical host machines to host the guest VMs. A relocation scenario for relocating the unproductive group of the guest VMs from the first group of the physical host machines to a second group of physical host machines is generated. An effect of the relocation scenario on infrastructure usage of the distributed computing system is estimated. The unproductive group of the guest VMs is relocated from the first group of the physical host machines to the second group of the physical host machines based on the relocation scenario.

Another embodiment disclosed herein is directed to a resource management node having a processor and a memory coupled to the processor. The memory includes computer readable program code that when executed by the processor causes the processor to perform operations. The operations can include identifying an unproductive group of guest virtual machines (VMs) that satisfy a defined rule for being unproductive on a first group of physical host machines based on infrastructure of a distributed computing system used by the first group of the physical host machines to host the guest VMs. A relocation scenario is generated for relocating the unproductive group of the guest VMs from the first group of the physical host machines to a second group of physical host machines. An effect of the relocation scenario on infrastructure usage of the distributed computing system is estimated. The unproductive group of the guest VMs is relocated from the first group of the physical host machines to the second group of the physical host machines based on the relocation scenario.

Another embodiment disclosed herein is directed to a computer program product that includes a computer readable storage medium having computer readable program code embodied in the medium. The computer readable program code includes computer readable code to identify an unproductive group of guest VMs that satisfy a defined rule for being unproductive on an first group of physical host machines based on infrastructure of a distributed computing system used by the first group of the physical host machines to host the guest VMs. The computer readable code generates a relocation scenario for relocating the unproductive group of the guest VMs from the first group of the physical host machines to a second group of physical host machines. The computer readable code estimates an effect of the relocation scenario on infrastructure usage of the distributed computing system. The computer readable code relocates the unproductive group of the guest VMs from the first group of the physical host machines to the second group of the physical host machines based on the relocation scenario.

Other resource management nodes, methods, and/or computer program products according to embodiments will be or become apparent to one with skill in the art upon review of the following drawings and detailed description. It is intended that all such additional resource management nodes, distributed computing systems, methods, and/or computer program products be included within this description and protected by the accompanying claims.

BRIEF DESCRIPTION OF THE DRAWINGS

Aspects of the present disclosure are illustrated by way of example and are not limited by the accompanying drawings. In the drawings:

FIGS. 15-17 are flowcharts that illustrate other operations for determining placement of VMs on physical host machines and placement of physical host machines in cabinets of a data center that satisfies a defined rule according to some embodiments;

FIG. 19 illustrates information that can be logically organized to generate a guest VM relocation scenario according to some embodiments;

FIG. 20 illustrates information that can be included in a decommissioning work order;

FIGS. 21 and 22 illustrates a cabinet before decommissioning of physical host machines based on a relocation scenario and after decommissioning the physical host machines based on the relocation scenario, respectively, according to some embodiments.

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

Figure 1:
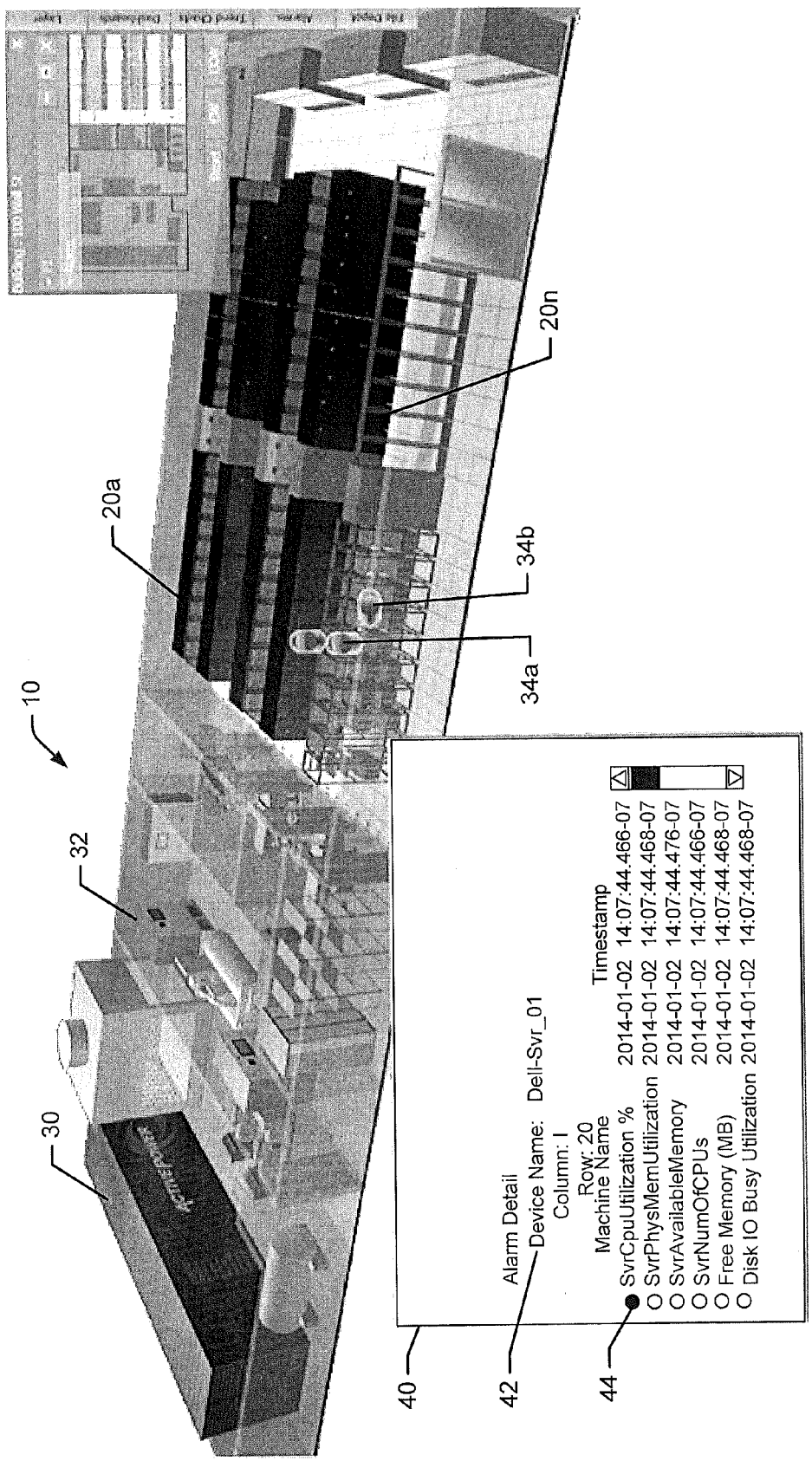
FIG. 1 is a pictorial illustration of a distributed computer system that is configured as a data center according to some embodiments.

FIG. 1 is a block diagram of a distributed computer system that is configured as a data center 10 according to some embodiments. The data center 10 can include hundreds or thousands of data servers which are mounted to physical racks 20a-20n arranged in rows for accessibility by operators. The data servers consume substantial amounts of electrical power from a power source 30, occupy significant amount of physical rack storage space of the data center 10, and require substantial cooling heat transfer by a cooling system 32 to remain within an acceptable operational temperature range. The electrical power, physical rack storage space, cooling, and other support systems are examples of infrastructure provided by the data center 10 to support operation of the data servers. In accordance with some embodiments, the data center 10 includes a resource management node, which can also be mounted within one or more of the physical racks 20a-20n or separate therefrom, and can operate according to various embodiments disclosed herein.

The data servers and associated network communication devices are example physical host machines of the data center 10. The data servers perform computer operations that provide a plurality of guest virtual machines (VMs) within a plurality of VM clusters. Each VM cluster can include a plurality of guest VMs, and each VM cluster can reside on different data servers or may be distributed across more than one data server. For each of the guest VMs, the resource management node determines a productivity metric for the guest VM based on resources of the data server used by the guest VM. Moreover, for each of the guest VMs, the resource management node determines based on the productivity metric an infrastructure value that indicates an amount of infrastructure of the data center 10 attributed to providing the guest VM.

In some further embodiments, the resource management node repeats these operations for each of the VM clusters. The infrastructure value may be determined based on electrical power consumption by the physical host machine which is attributed to providing the guest VM. The infrastructure value may additionally or alternatively be determined based on physical rack storage space of the distributed computing system occupied by the physical host machine which is attributed to providing the guest VM.

The resource management node can display reports that indicate which VM clusters are determined to satisfy rules for being productive versus unproductive. The reports may alternatively or additionally indicate which VM clusters are consuming excessive electrical power, physical rack storage space, and/or other resources of the data center 10 relative to being productive versus unproductive.

In FIG. 1, a report 40 is displayed, on a display device of a data center terminal, that identifies the name 42 of one of the server devices and identifies the utilization of defined resources 44. The resource utilizations displayed can include server CPU utilization percentage, server physical memory utilization, server available memory, server number of CPUs, free memory, and/or disk input/output busy utilization. The report may further indicate if any of the resources are operating near defined limits (e.g., excessive server CPU utilization percentage is noted by the blackened circle).

A pictorial illustration of the data center 10 may also be displayed. The resource management node may display graphical alarm indications 34a and 34b at particular locations of the racks where the data center operator may want to remove or replace one of the server devices based on information provided by the resource management node according to one or more embodiments disclosed herein.

These and other operations are explained in further detail below after the following explanation of an example resource node and distributed computing system in which the operations may be performed.

Resource Node of a Distributed Computing System

Figure 2:
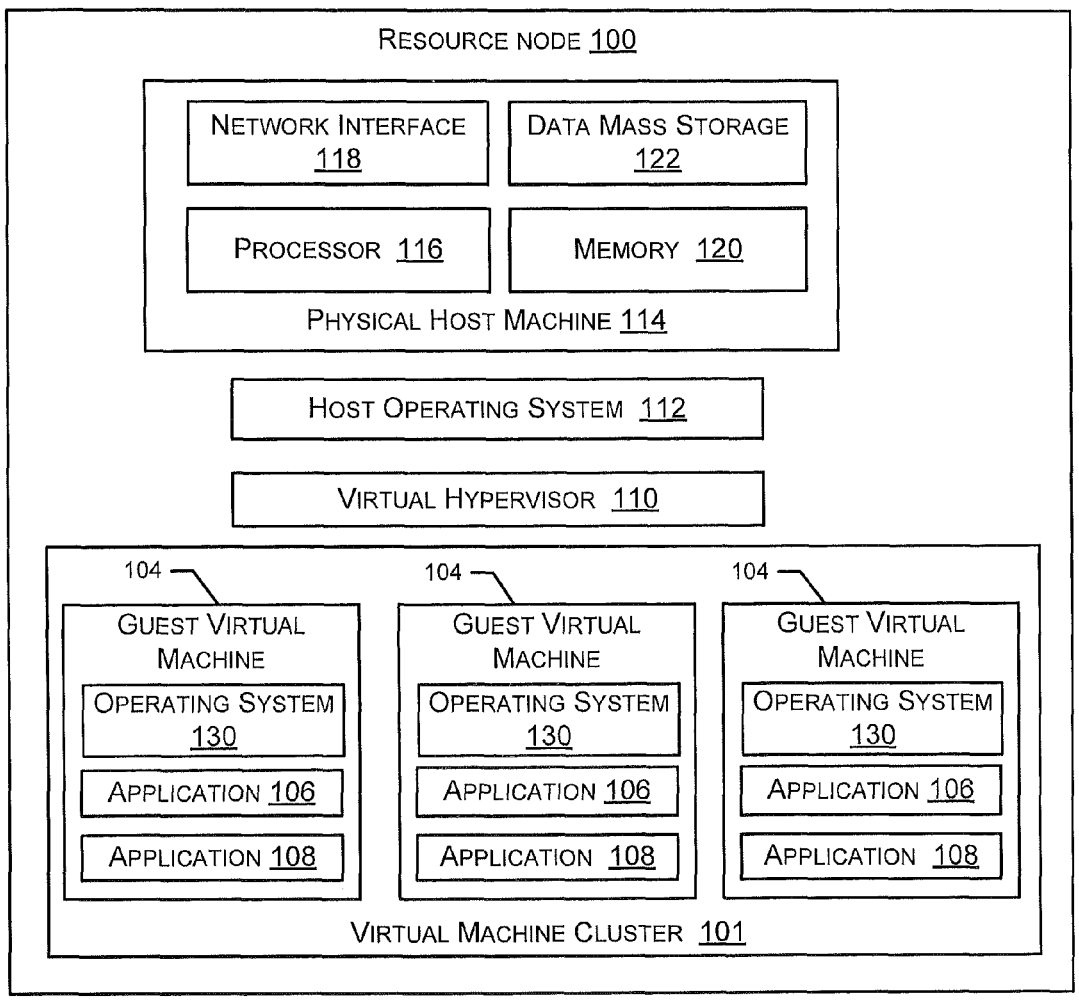
FIG. 2 is a block diagram of a resource node, used in a distributed computing system, that is configured according to some embodiments.

FIG. 2 is a block diagram of a resource node 100 of a distributed computing system that is configured according to some embodiments. Referring to FIG. 2, the resource node 100 includes a physical host machine 114 that performs computer operations to provide one or more VM clusters 101. Each of the VM clusters includes a plurality of guest VMs 104. Each guest VM 104 runs a guest operating system 130 and a plurality of applications 106 and 108. The computing needs of users 102 (e.g., humans and/or other virtual/non-virtual machines) drive the functionality of the VM cluster 101 and guest VMs 104 thereof. A virtual hypervisor 110 can provide an interface between the VM cluster 101 and a host operating system 112 and allows multiple guest operating systems 130 and associated applications 106 and 108 to run concurrently. The host operating system 112 is responsible for the management and coordination of activities and the sharing of the computer resources of the physical host machine 114.

The physical host machine 114 may include, without limitation, network content servers (e.g., Internet website servers, movie/television programming streaming servers, application program servers), network storage devices (e.g., cloud data storage servers), network data routers, network gateways, communication interfaces, program code processors, data memories, display devices, and/or peripheral devices. The physical host machine 114 may include computer resources such as: processor(s) 116 (e.g., central processing unit, CPU); network interface(s) 118; memory device(s) 120; data mass storage device(s) 122 (e.g., disk drives, solid state nonvolatile memory, etc.); etc. The processor(s) 116 is configured to execute computer program code from the memory device(s) 120, described below as a computer readable storage medium, to perform at least some of the operations disclosed herein.

Besides acting as a host for computing applications 106 and 108 that run on the physical host machine 114, the host operating system 112 may operate at the highest priority level of the resource node 100, executing instructions associated with the physical host machine 114, and it may have exclusive privileged access to the physical host machine 114. The host operating system 112 creates an environment for implementing the VM cluster 101 which hosts the guest VMs 104. One host operating system 112 is capable of implementing multiple independently operating VM clusters 101 simultaneously.

The virtual hypervisor 110 (which may also be known as a virtual machine monitor or VMM) runs on the host operating system 112 and provides an interface between the VM clusters 101 and the physical host machine 114 through the host operating system 112. The virtual hypervisor 110 virtualizes the computer system resources and facilitates the operation of the host guest VMs 104 and associated VM cluster 101. The virtual hypervisor 110 may provide the illusion of operating at a highest priority level to the guest operating system 130. However, the virtual hypervisor 110 can map the guest operating system's priority level to a priority level lower than a top most priority level. As a result, the virtual hypervisor 110 can intercept the guest operating system 130 operations, and execute instructions that require virtualization assistance. Alternatively, the virtual hypervisor 110 may indirectly emulate or directly execute the instructions on behalf of the guest operating system 130. Software steps permitting indirect interaction between the guest operating system 130 and the physical host machine 114 can also be performed by the virtual hypervisor 110.

The VMs 104 present a virtualized environment to the guest operating systems 130, which in turn provide an operating environment for the applications 106 and 108, and other software constructs.

Distributed Computing System

Figure 3:
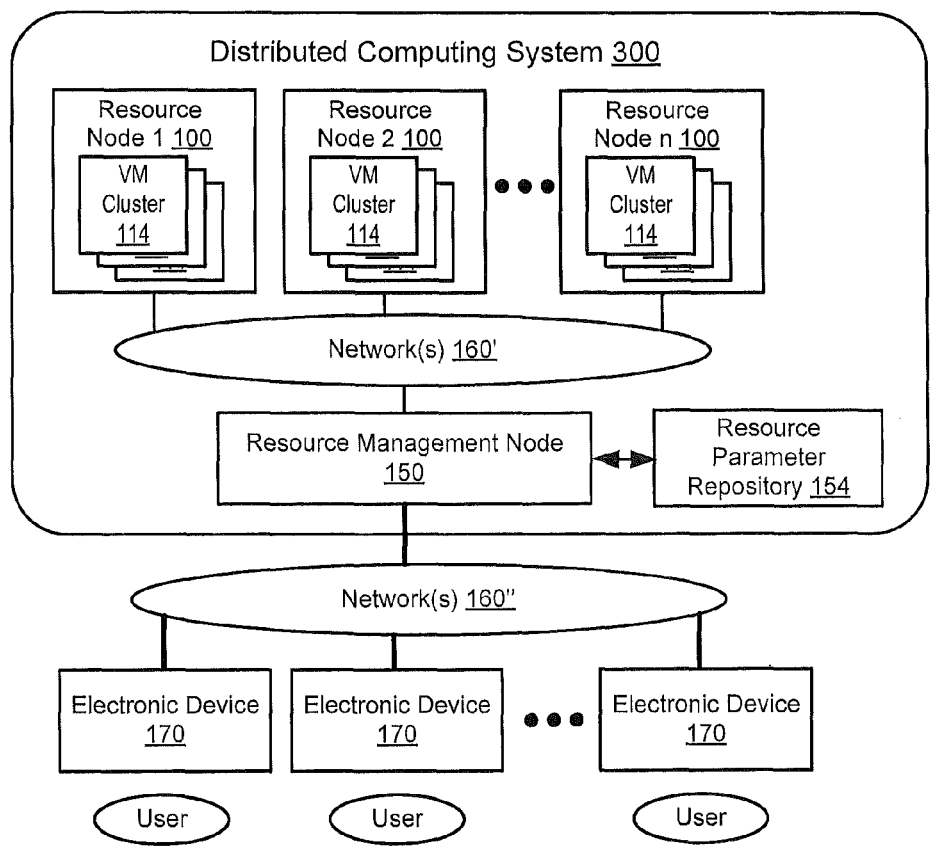
FIG. 3 is a block diagram of a distributed computing system that is configured according to some embodiments.

FIG. 3 is a block diagram of a distributed computing system 300 that is configured according to some embodiments. Referring to FIG. 3, the distributed computing system 300 receives requests from electronic devices 170 via one or more networks 160'-160" for processing. The electronic devices 170 may be operated by end-users. The distributed computing system 300 includes a plurality of resource nodes 100 and a resource management node 150. The electronic devices 170 may include, but are not limited to, desktop computers, laptop computers, tablet computers, wireless mobile terminals (e.g., smart phones), gaming consoles, networked televisions with on-demand media request capability. The resource nodes 100 may be configured as described herein regarding FIG. 2. For some distributed computing systems 300, the number of resource nodes 100 can number more than a hundred or thousand and the number of electronic devices 170 can number more than a thousand or hundred thousand.

The resource management node 150 may operate to distribute individual requests that are received from the electronic devices 170 to particular ones of the resource nodes 100 selected for processing. The resource management node 150 may select among the resource nodes 100 and/or applications hosted on VM clusters 101 of the resource nodes 100 for distributing individual requests responsive to the present loading of the resource nodes 110 and/or the VM clusters 101. The loading may be determined based on the amount of processing resources, volatile memory resources, non-volatile mass storage resources, communication resources, and/or application resources that are utilized to process the requests. The resource management node 150 may, for example, operate to distribute the requests responsive to comparison of the relative loading characteristics of the resource nodes 100. The resource management node 150 may attempt to obtain a more balanced loading across the resource nodes 100 to avoid one of the resource nodes 100 operating at more than a threshold loading above other ones of the resource nodes 100.

Example Resource Management Node

Figure 4:
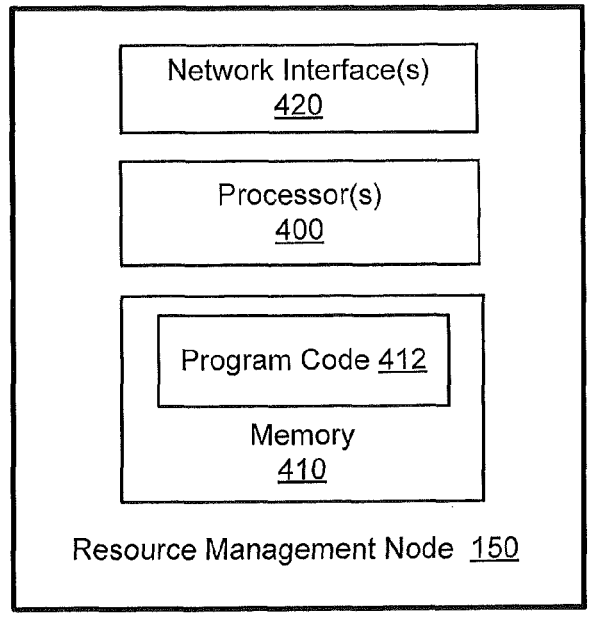
FIG. 4 is a resource management node that is configured according to some embodiments.

FIG. 4 is a block diagram of a resource management node 150 that is configured to perform the operations of one of more of the embodiments disclosed herein. The resource management node 150 can include one or more network interfaces 420, one or more processors 400 (referred to as "processor" for brevity), and one or more memories 410 (referred to as "memory" for brevity) containing program code 412.

The processor 400 may include one or more data processing circuits, such as a general purpose and/or special purpose processor (e.g., microprocessor and/or digital signal processor) that may be collocated or distributed across one or more networks. The processor 400 is configured to execute program code 412 in the memory 410, described below as a computer readable medium, to perform some or all of the operations for one or more of the embodiments disclosed herein.

VM Cluster Utilization of Distributed Computing System Infrastructure

As explained above, a distributed computing system (e.g., data center) can include hundreds or thousands of physical host machines (e.g., data servers). The physical host machines perform computer operations that provide a plurality of guest VMs within a plurality of VM clusters. Each VM cluster can include a plurality of guest VMs.

FIGS. 5-8 illustrates operations that can be performed by a resource management node 150.

Figure 5:
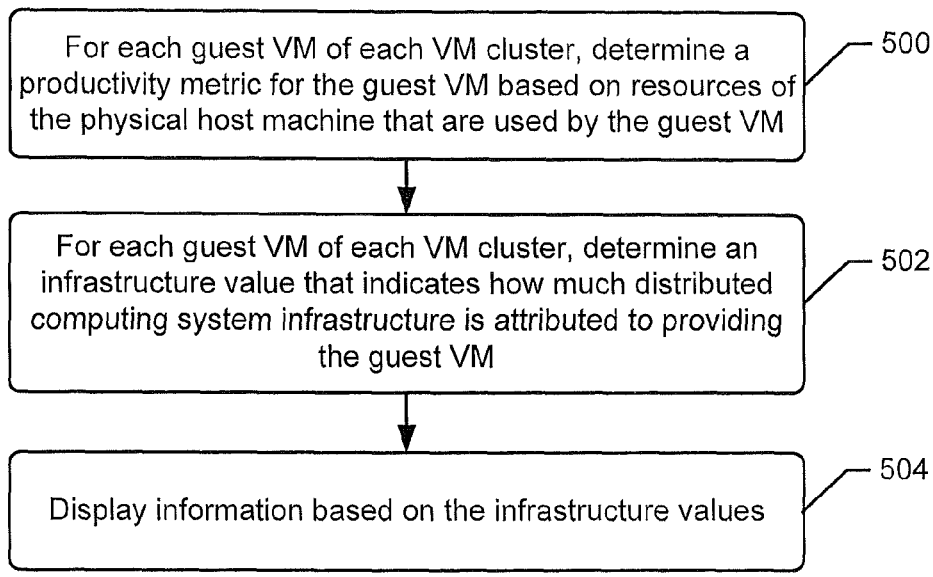
FIGS. 5-8 are flowcharts that illustrate operations for determining an amount of infrastructure of a distributed computing system attributed to providing guest VMs according to some embodiments.

Referring to FIG. 5, for each of the guest VMs of a VM cluster, the resource management node 150 determines (block 500) a productivity metric for the guest VM based on resources of the physical host machine used by the guest VM. Moreover, for each of the guest VMs, the resource management node 150 determines (block 502), based on the productivity metric for the guest VM, an infrastructure value that indicates an amount of infrastructure of the distributed computing system 300 attributed to providing the guest VM. The resource management node 150 may also display (504) information for viewing by an operator based on the infrastructure values. The resource management node can repeat the operations of blocks 500, 502, and 504 for each of the VM clusters.

The infrastructure value may be determined based on electrical power consumption by the physical host machine which is attributed to providing the guest VM. The infrastructure value may additionally or alternatively be determined based on physical rack storage space of the distributed computing system occupied by the physical host machine which is attributed to providing the guest VM. Other infrastructure of the distributed computing system that can be attributed to being used to provide the guest VM can include one or more of: cooling system utilization, processing throughput, memory utilization, nonvolatile mass data storage utilization, communication input/output utilization, and application resource utilization (e.g., what types and how many applications programs).

The resource management node 150 may determine (block 500) the productivity metric for a guest VM by, for example, determining the processor loading created by the guest VM, determining an amount of memory used by or allocated to the guest VM, determining an amount of nonvolatile mass data storage that is used by or allocated to the guest VM, determining communication input/output bandwidth used by the guest VM, and/or a number of applications used by the guest VM.

The resource management node 150 may determine (block 502) the infrastructure value that indicates an amount of infrastructure of the distributed computing system attributed to providing the guest VM by, for example, determining an amount of electrical power consumed by the physical host machine to provide the guest VM, determining physical rack storage space occupied by the physical host machine to provide the guest VM, determining cooling system resources of a distributed computing system that are used by the physical host machine to provide the guest VM, determining communication bandwidth resources of a distributed computing system that are used by the physical host machine to provide the guest VM, determining data storage resources of a distributed computing system that are used by the physical host machine to provide the guest VM etc.

Figure 7:
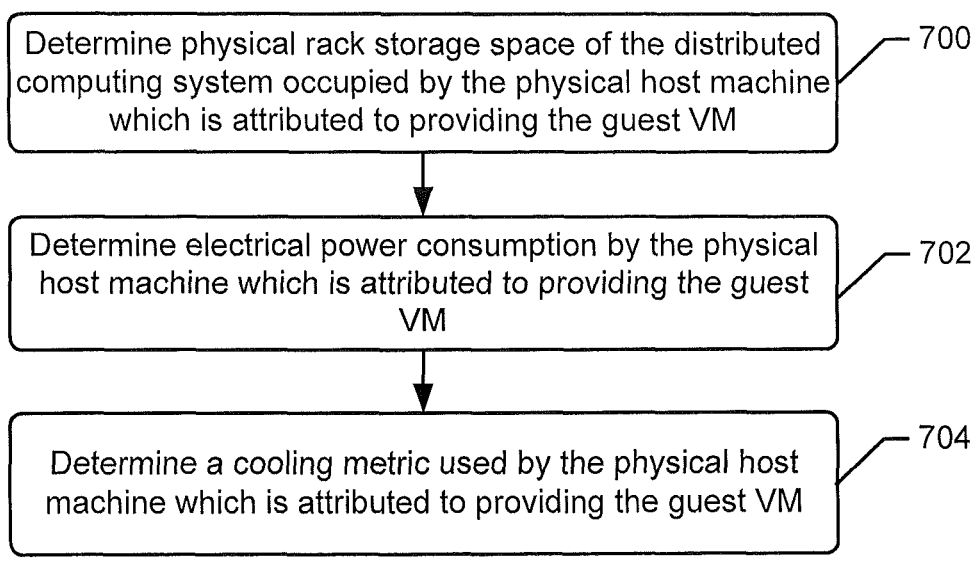

FIG. 7 illustrates operations that can be performed by the resource management node 150 to determine an amount of infrastructure of the distributed computing system 300 attributed to providing a guest VM. Referring to FIG. 7, the resource management node 150 determines (block 700) a physical rack storage space of the distributed computing system 300 that is occupied by the physical host machine and which is attributed to providing the guest VM, based on the productivity metric for the guest VM. The electrical power consumption by the physical host machine which is attributed to providing a guest VM can be determined (block 702) based on the productivity metric for the guest VM. A cooling metric (e.g., British thermal units, rack cooling index, etc.) used by the physical host machine which is attributed to providing a guest VM can be determined (block 704) based on the productivity metric for the guest VM.

Determining the physical rack storage space, the electrical power consumption, and/or the cooling metric can be based on known relationships between the physical host machine and defined infrastructure characteristics that are known or observed to be consumed by the physical host machine operating at different loading. The relationships may be specified by manufacturers and/or operators, calculated, and/or developed by data collection processes that can include monitoring effects that different observed guest VM loading and/or VM cluster loading have on the infrastructure requirements of a distributed computing system, such as the electrical power consumption, cooling metrics, and/or physical rack storage space use by the physical host machines to provide processing and other resources for the guest VMs and/or VM clusters. A Data Center Infrastructure Management™ (DCIM) tool by CA Technologies may be used to provide information used by the relationships to determine the infrastructure attributed to providing a guest VM.

In one embodiment, the infrastructure attributed to operation of a physical machine is determined. The determined infrastructure is then proportionally attributed to each of the guest VMs hosted by the physical machine based on the relative utilization of the physical machine's resources by respective ones of the guest VMs. For example, when four guest VMs each use 10% of a physical machine resource and a fifth guest VM uses 60% of the physical machine resource, then the infrastructure used (power, cooling, space, etc.) by the physical machine can be attributed 10% to each of the four guest VMs and attributed 60% to the fifth guest VM. The physical machine resource utilization may be determined based on any defined resources of the physical machine that can be used by a guest VM including, but not limited to, processor utilization, memory utilization, network interface utilization, disk input/output utilization, and/or a combination thereof.

When determining the relative utilization, the physical machine resource used by overhead system services (e.g., host operating system, data archiving applications, virus scanning applications, physical device manager applications, display applications, etc.) may be included or excluded from the calculation. Excluding physical machine resources used by overhead system services may enable more accurately determination of how much infrastructure is needed to support the guest VMs (e.g., how much user directed work is done by a physical machine and how much associated infrastructure is used to support that work).

For example, electrical power consumption and/or cooling loading by a physical machine may be defined by a manufacturer and/or operator, and/or measured during operation of the physical machine under various resource loading scenarios (e.g., processor utilization, memory utilization, network interface utilization, disk input/output utilization, and/or a combination thereof). The resource loading scenarios may be defined to exhibit known characteristics of defined types of guest VMs.

Referring again to FIG. 3, the distributed computing system 300 may include a resource parameter repository 154 that contains information that identifies relationships between different identified types of physical host machines and the quantities of infrastructure (e.g., electrical power, rack space, cooling, communication bandwidth, data storage, etc.) of a distributed computing system they respectively consume when operating. The relationships may further identify how the quantities of consumed infrastructure vary with different loading of the physical host machines. The resource parameter repository 154 may indicate other attributes of the physical host machines, such as their start-up time, shut-down time, peak and average electrical power utilization, communication bandwidth capabilities, processing throughput capabilities, data storage capabilities, available application resources, etc.

The resource management node can display reports that indicate which VM clusters are determined to satisfy rules for being productive versus unproductive. The reports may alternatively or additionally indicate which VM clusters are consuming excessive electrical power, physical rack storage space, and/or other resources of the data center 10 relative to being productive versus unproductive. Example reports are shown in FIG. 1 described above and FIGS. 7 and 8 described further below.

Figure 6:
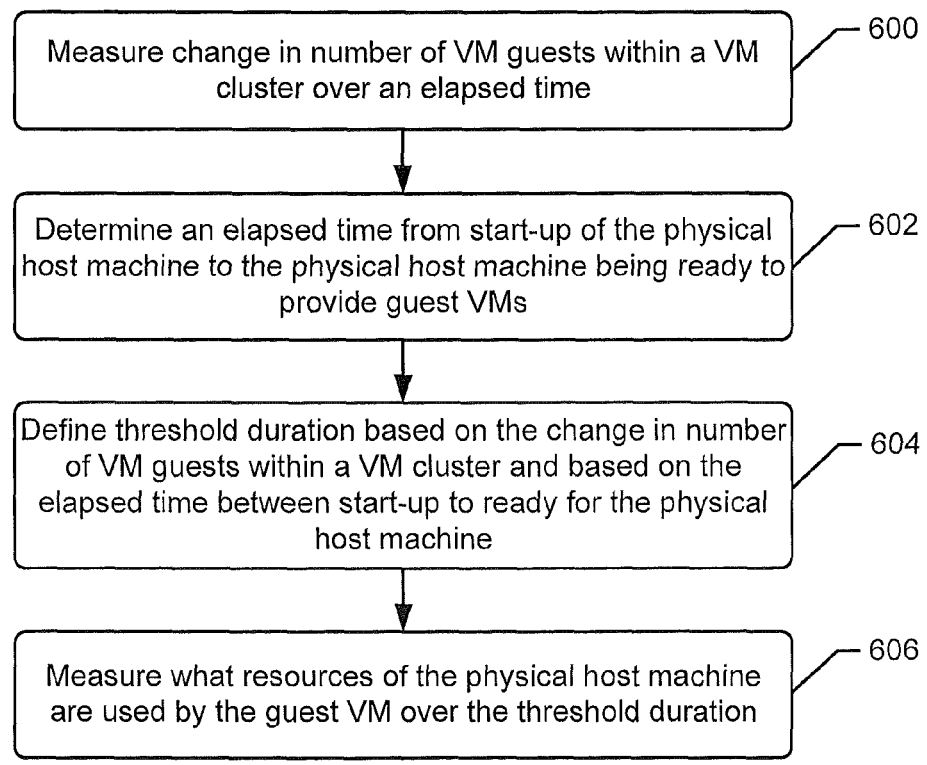

In one embodiment, a time window over which the productivity metric is measured may be adjusted/controlled based on how quickly physical host machines can be started up (e.g. brought on-line from an idle state or booted-up from a power-off state to be available to provide VMs to provide services to electronic devices 170) and/or shut-down. Referring to FIG. 6, the resource management node 150 may determine the productivity metric by measuring (block 600) what resources of the physical host machine are used by the guest VM over a threshold duration that is defined based on observed change in number of VM guests within a VM cluster over an elapsed time. The resource management node 150 may alternatively or additionally determine (block 602) an elapsed time from start-up of the physical host machine to the physical host machine being ready to provide guest VMs. The threshold duration can be defined (block 604) based on the change number of VM guest within a VM cluster and/or based on the elapsed time between start-up and the physical host machine being ready to provide guest VMs. The resources of the physical host machine that are used by the guest VM can be measured (block 606) over the threshold duration.

Thus, for example, it may be desirable to avoid presenting information that could cause the resource management node and/or a system operator (human) to make guest VM, physical machine, and/or other management decisions based on short duration or momentary changes occurring in productivity metrics for physical host machines that have a slower start-up time. So, slower startup times may cause the resource management node 150 to use corresponding longer elapsed times over which the productivity metrics are measured.

Similarly, it may be desirable to avoid presenting information that could cause a the resource management node and/or system operator to make guest VM, physical machine, and/or other management decisions based on short duration or momentary changes occurring in productivity metrics for physical host machines having rapidly changing numbers of guest VMs provided within a VM cluster. For example, the rapid increase in the number of guest VMs may be an indication of an anticipated near-term rapid increase in loading of the physical host machine, which may be beneficial for a system operator and/or the resource management node to know. So, observation of greater changes in the number of guest VMs provided within a VM cluster may cause the resource management node 150 to use corresponding shorter elapsed times over which the productivity metrics are measured.

Determining Infrastructure Used by Unproductive and Productive VM Clusters

In some further embodiments, the resource management node 150 determines for each VM cluster the amount of infrastructure of the distributed computing system 300 being used by the VM cluster (e.g., electrical power, rack space, cooling, communication bandwidth, data storage, etc.), and can display information to a system operator to enable improved infrastructure consumption management and deployment of VM guests to VM clusters and VM clusters to physical host machines.

Figure 8:
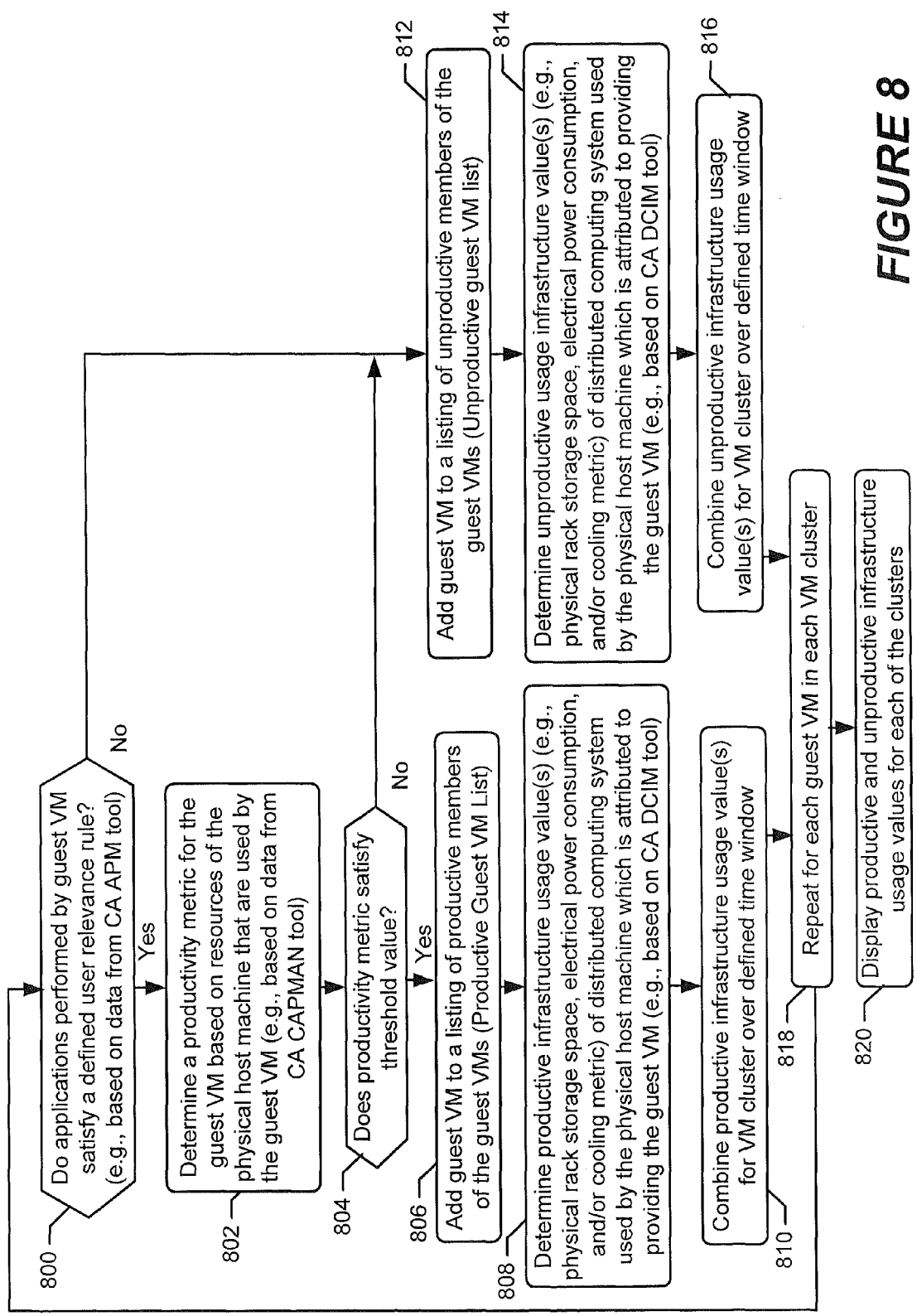

In some embodiments, guest VMs of a VM cluster are sorted between productive and unproductive lists. The infrastructure used by each of the VM clusters is determined for each of the productive and unproductive lists of associated guest VMs. FIG. 8 illustrates operations that may be performed by the resource management node 150 to determine the productivity of guest VMs and VM clusters, and to determine the infrastructure they are using.

Referring to FIG. 8, a guest VM is analyzed to determine (block 800) whether the applications performed by the guest VM satisfy a defined user relevance rule for providing at least a threshold level of client services to user clients. The user relevance rule may identify applications or characteristics of applications that make the applications productive or unproductive. For example, applications that operate primarily to provide overhead system services for maintaining a physical host machine and/or operating a VM cluster (e.g., data archiving applications, virus scanning applications, physical device manager applications, display applications, etc.) without providing services for a user can be defined by the user relevance rule to be unproductive. In contrast, applications that provide client services to users (e.g., word processing applications, database applications, voice-recognition applications, gaming applications, financial applications, etc.) can be defined by the user relevance rule to be productive. The resource management node 150 may determine application relevance based on application characteristics information provided by an Application Performance Management™ (APM) tool by CA Technologies.

When a guest VM is determined to be productive, a productivity metric is determined (block 802) for the guest VM based on resources of the physical host machine that are used by the guest VM. The productivity metric may be determined based on processor utilization, memory utilization, nonvolatile mass data storage utilization, communication input/output interface device utilization, and/or application resource utilization. The resource management node 150 may receive and use utilization information from a Capacity Management (CAPMAN) tool by CA Technologies. The utilization information can be a time series stream of utilization values that are observed for defined resources, and may have time stamps associated therewith to allow averaging or other combining operations over defined time periods. The productivity metric may be determined over a time period that is defined based on the user defined setting (e.g., defined number of minutes, days, etc.), characteristics of the physical host machine, and/or rate of change in resource utilization.

In one embodiment, the time period over which the productivity metric is measured may be adjusted/controlled based on how quickly physical host machines can be started up (e.g. brought on-line from an idle state or booted-up from a power-off state to be available to provide VMs to provide services to electronic devices 170). Slower startup times may cause the resource management node 150 to use corresponding longer time periods over which the productivity metric is measured.

In another embodiment, the time period over which the productivity metric is measured may be adjusted/controlled based on how quickly the numbers of guest VMs provided within a VM cluster is changing. So, observation of greater changes in the number of guest VMs provided within a VM cluster may cause the resource management node 150 to use corresponding shorter time periods over which the productivity metric is measured.

A determination (block 804) is made whether the productivity metric for a guest VM satisfies a threshold value. When the productivity metric for a guest VM satisfies the threshold value (e.g., the guest VM consumes more than a threshold amount of resources of the physical host machine), the guest VM is added (block 806) to a listing of productive members of the guest VMs of a VM cluster. The productive infrastructure usage value(s) (e.g., physical rack storage space, electrical power consumption, and/or cooling metric) used by the physical host machine which is attributed to providing the guest VM is determined (block 808). For example, each different type of infrastructure parameters can have a separate productive infrastructure usage value (e.g., physical rack storage space usage value, power consumption usage value (e.g., average power (kW) or total energy (kWh), and/or cooling metric usage value (British thermal unit, etc.)). The resource management node 150 may determine the productive infrastructure usage value(s) for a guest VM based on infrastructure usage information provided by a Data Center Infrastructure Management™ (DCIM) tool by CA Technologies. The productive infrastructure usage value(s) is combined (block 810) with other productive infrastructure values determined for the VM cluster (which includes the guest VM) over a defined time window (e.g., averaged over the defined time window).

In contrast, when a guest VM is determined (block 800) to be unproductive or when a productivity metric for a guest VM is determined (block 804) to not satisfy the threshold value (e.g., the guest VM consumes less than a threshold amount of resources of the physical host machine), the guest VM is added (block 812) to a listing of unproductive members of the guest VMs of a VM cluster. The unproductive infrastructure usage value(s) (e.g., physical rack storage space, electrical power consumption, and/or cooling metric) used by the physical host machine which is attributed to providing the guest VM is determined (block 814). The resource management node 150 may determine the unproductive infrastructure usage value(s) for a guest VM based on information provided by the DCIM tool. The unproductive infrastructure usage value(s) is combined (block 810) with other unproductive infrastructure values determined for the VM cluster (which includes the guest VM) over a defined time window (e.g., averaged over a defined time window).

The time window may be adjusted/controlled based on an operator defined setting, how quickly physical host machines can be started up or shut-down, and/or based on how quickly the numbers of guest VMs provided within a VM cluster is changing.

The operations of blocks 800-816 can be repeated for each guest VM in each of the VM clusters. The productive infrastructure usage values and the unproductive infrastructure usage values can be displayed (block 820) for each of the clusters.

Figure 9:
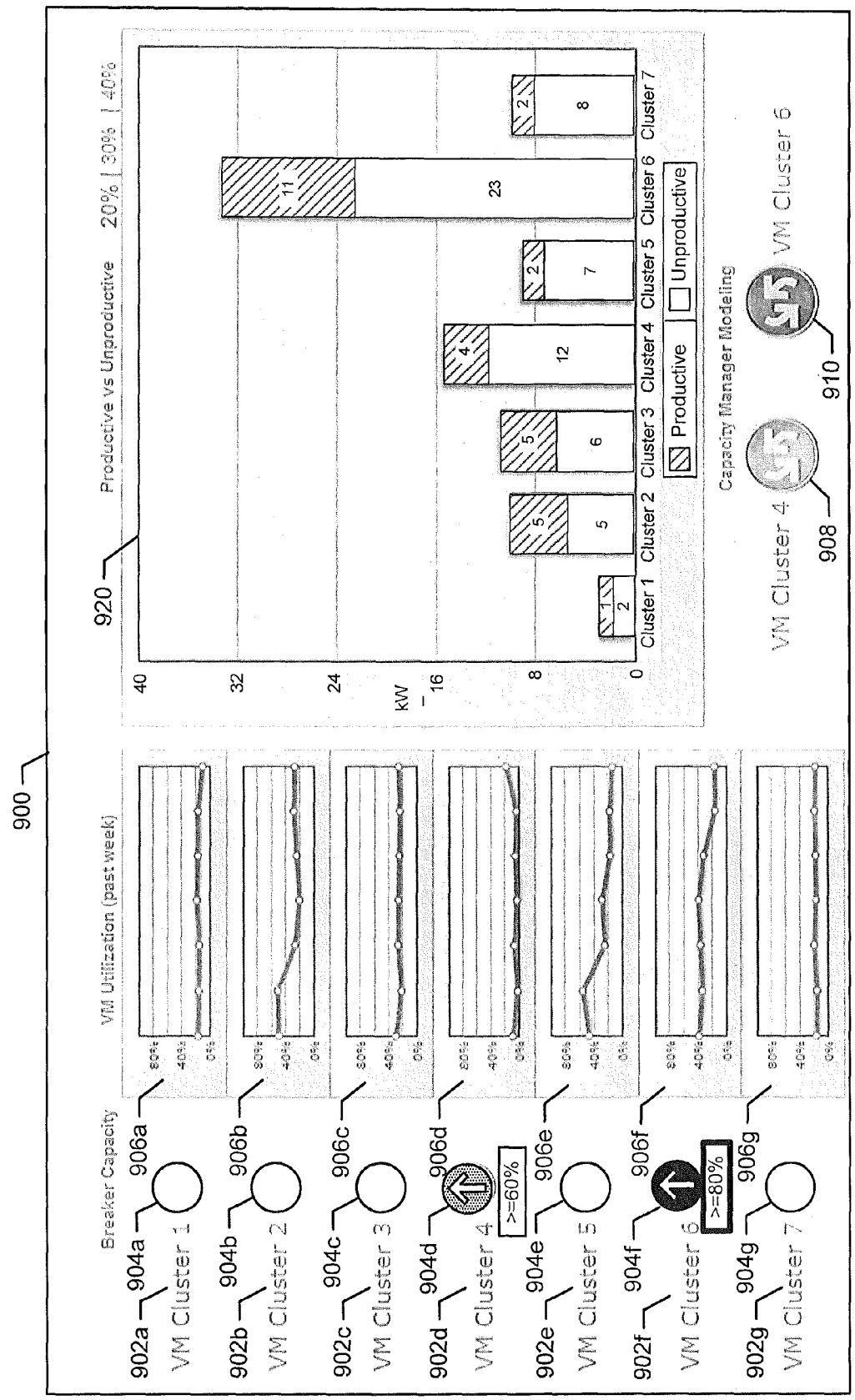
FIG. 9 illustrates information that may be displayed to inform an operator of which guest VMs of VM clusters satisfy rules for being productive versus unproductive, and to further inform the operator of the infrastructure utilization of the productive and unproductive guest VMs and associated clusters.

Determining and Displaying Infrastructure Used by Unproductive and Productive VM Clusters FIG. 9 illustrates information that may be displayed to inform an operator regarding which VM clusters satisfy rules for being productive versus unproductive, and to further inform the operator of the infrastructure utilization of the VM clusters. FIG. 9 illustrates seven VM clusters named VM Cluster 1, VM Cluster 2, VM Cluster 3, VM Cluster 4, VM Cluster 5, VM Cluster 6, and VM Cluster 7 which are referred to herein with underlining between the phrase "VM Cluster" and the respective cluster number 1 through 7. Referring to FIG. 9, graphs 906a-906g are generated that illustrate the average resource utilization by seven different VM clusters 902a-902g over a past week. The average resource utilization may correspond to the average processor utilization, memory utilization, nonvolatile mass data storage utilization, communication input/output interface device utilization, and/or application resource utilization attributed to providing the respective VM clusters 902a-902g over the past week.

Other information that may be displayed can include, alert notifications 904a-904g which notify an operator when one or more of the VM clusters 902a-902g is using too much or too little infrastructure. In FIG. 9, the alert notifications 904a-904g indicate whether a particular VM cluster is using excessive electrical circuit breaker capacity. For example, VM Cluster_4 902d has a highlighted alert notification 904d with a sub-text notification indicating that it is drawing at least 60 percent of the maximum electrical power that can be supplied within the capacity rating of the associated circuit breaker resource of the distributed computing system 300. Another VM Cluster_6 902f has a highlighted alert notification 904f with a sub-text notification indicating that it is drawing at least 80 percent of the maximum electrical power that can be supplied within the capacity rating of the associated circuit breaker resource of the distributed computing system 300. These notifications can inform a system operator and/or the resource management node that VM Cluster_4 902d and VM Cluster_6 902f are drawing excessive electrical power, and can provide such notification before the circuit breaker switches become overloaded. The system operator can thereby take corrective action by shifting guest VMs from those VM clusters to other VM clusters. Moreover, the system operator may determine that VM Cluster_4 902d and VM Cluster_6 902f have an operational fault associated with their physical host machines because of the excessive electrical power being consumed relative to the low average resource utilization indicated in their respective graphs 906d and 906f. The system operator may therefore initiate procedures to shut-down and replace those physical host machines.

The resource management node 150 may respond to detecting the alarm conditions with VM Cluster_4 902d and VM Cluster_6 902f by displaying indicia 908 and 910 which can be selected by a system operator to initiate actions to further analyze and/or remedy the alarm conditions with VM Cluster_4 902d and VM Cluster_6 902f.

Other information that can be displayed can include a graph 920 showing the relative amount of infrastructure of the distributed computing system 300 that is being used by unproductive guest VMs and productive guest VMs of each of the VM clusters 902a-902g. In the example of FIG. 9, VM Cluster_1 has 1 productive guest VM and 2 unproductive guest VMs, and consumes a total of about 3 kWatts of electrical power. VM Cluster_2 has 5 productive guest VMs and 5 unproductive guest VMs, and consumes a total of about 10 kWatts of electrical power. VM Cluster_3 has 5 productive guest VMs and 6 unproductive guest VMs, and consumes a total of about 12 kWatts of electrical power. VM Cluster_4 has 4 productive guest VMs and 12 unproductive guest VMs, and consumes a total of about 15.5 kWatts of electrical power. VM Cluster_5 has 2 productive guest VMs and 7 unproductive guest VMs, and consumes a total of about 9 kWatts of electrical power. VM Cluster_6 has 11 productive guest VMs and 23 unproductive guest VMs, and consumes a total of about 34 kWatts of electrical power. VM Cluster_7 has 2 productive guest VMs and 8 unproductive guest VMs, and consumes a total of about 10 kWatts of electrical power.

A system operator may determine from the information displayed by the graph 920 that VM Cluster 6 is consuming substantially more electrical power to provide unproductive guest VMs relative to what it consumes to provide productive guest VMs. The system operator may therefore perform operations to shift the 11 productive guest VMs from VM cluster 6 to other VM clusters, such as VM clusters 4, 5 and 8 which also are determined to be consuming substantially more power for purposes of providing unproductive guest VMs then for productive guest VMs.

Alternatively or additionally, the system operator may perform operations to terminate operation or reschedule operation for a later time at least some of the unproductive guest VMs on one or more of the VM clusters 4-7 which are consuming disproportionate amounts of electrical power relative to their usefulness with supporting operation of the productive guest VMs in their respective VM clusters. Thus for example, guest VMs providing data archiving applications and/or virus scanning that consume substantial electrical power because of their associated disk bandwidth, disk input/output operations and processing operations can be terminated or reschedule for later operation to provide a more efficient balance of power consumption between the productive and unproductive guest VMs for those VM clusters.

The excessive power consumption of the nonproductive guest VMs of one or more of VM clusters 4-7 may indicate the VM cluster is having operational problems and should be restarted and/or that the associated physical host machine 114 providing the VM cluster is having operational problems and should be restarted, shut-down, or replaced. A system operation may thereby be informed of problems before they result in software and/or hardware failure.

Cabinet Layout in Data Center for Physical Host Machine Placement

Figure 10:
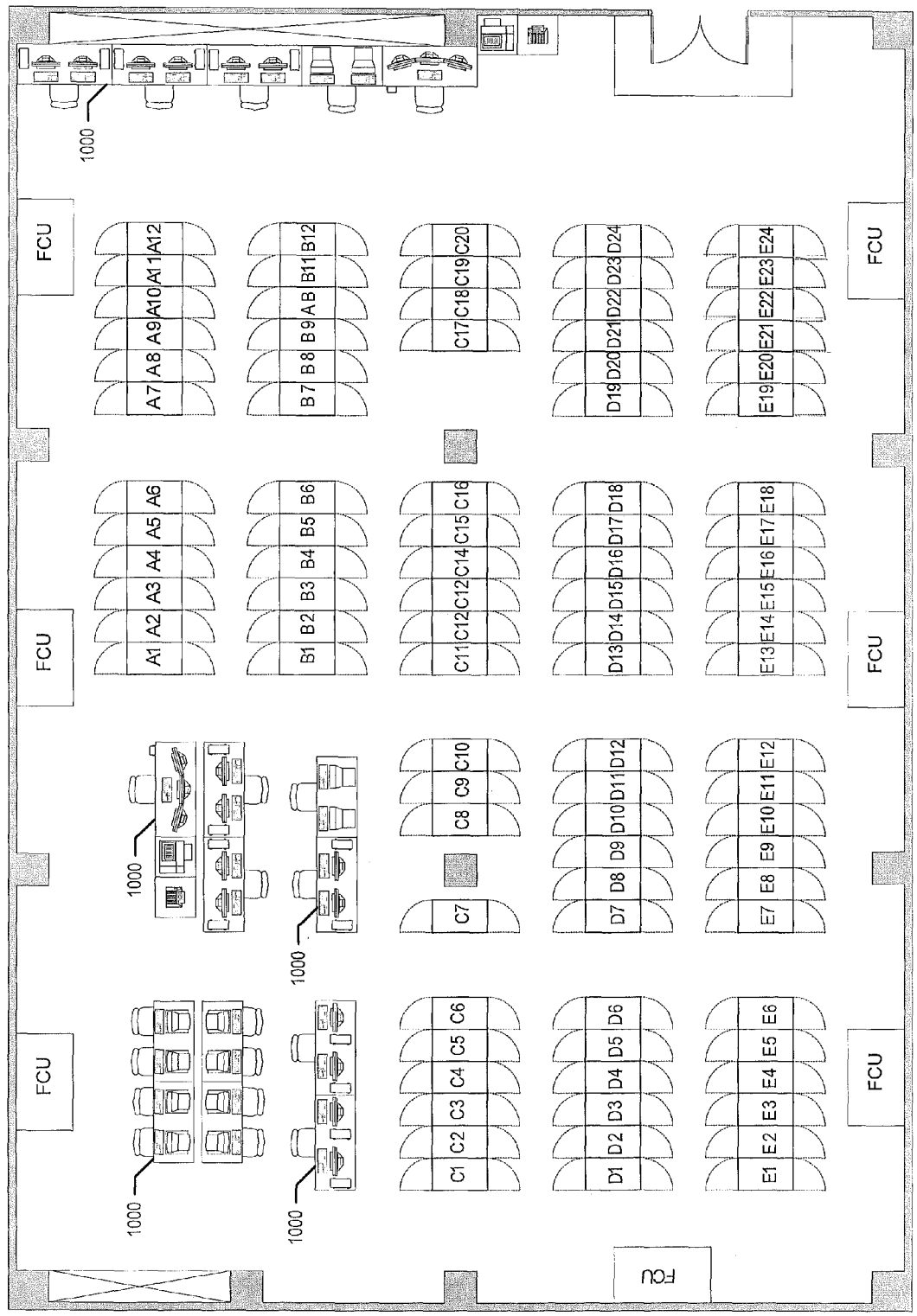
FIG. 10 is a schematic illustration of a cabinet layout in a data center for physical host placement according to some embodiments.

FIG. 10 is a schematic illustration of a cabinet layout in a data center for physical host placement according to some embodiments. The data center includes cabinets (also commonly referred to as "racks") A1-12, B1-12, C1-20, D1-24, and E1-24 arranged in rows and columns for accessibility by operators. Each cabinet contains physical storage spaces (e.g., mounting spaces on rack(s), use/unit spaces "U-spaces", etc.) where physical host machines can be installed to host guest VMs. Facilities control units (FCU) have electrical power sources (e.g., power conditioning and backup power sources), cooling devices, and other equipment that supports operation of physical host machines in the cabinets. Each cabinet can include a local electrical power supply device(s) and a cooling device(s) that cools physical host machines mounted in the cabinet. In accordance with some embodiments, the data center includes a resource management node that may reside within one or more of the cabinets or separate therefrom (e.g., within an operator work station or outside the data center), and is configured to operate according to one or more embodiments disclosed herein. A plurality of operator work stations 1000 are illustrated having computer processing and display devices for use by operators to monitor operation of the data center and control operation of the resource management node according to one or more embodiments disclosed herein.

Figure 11:
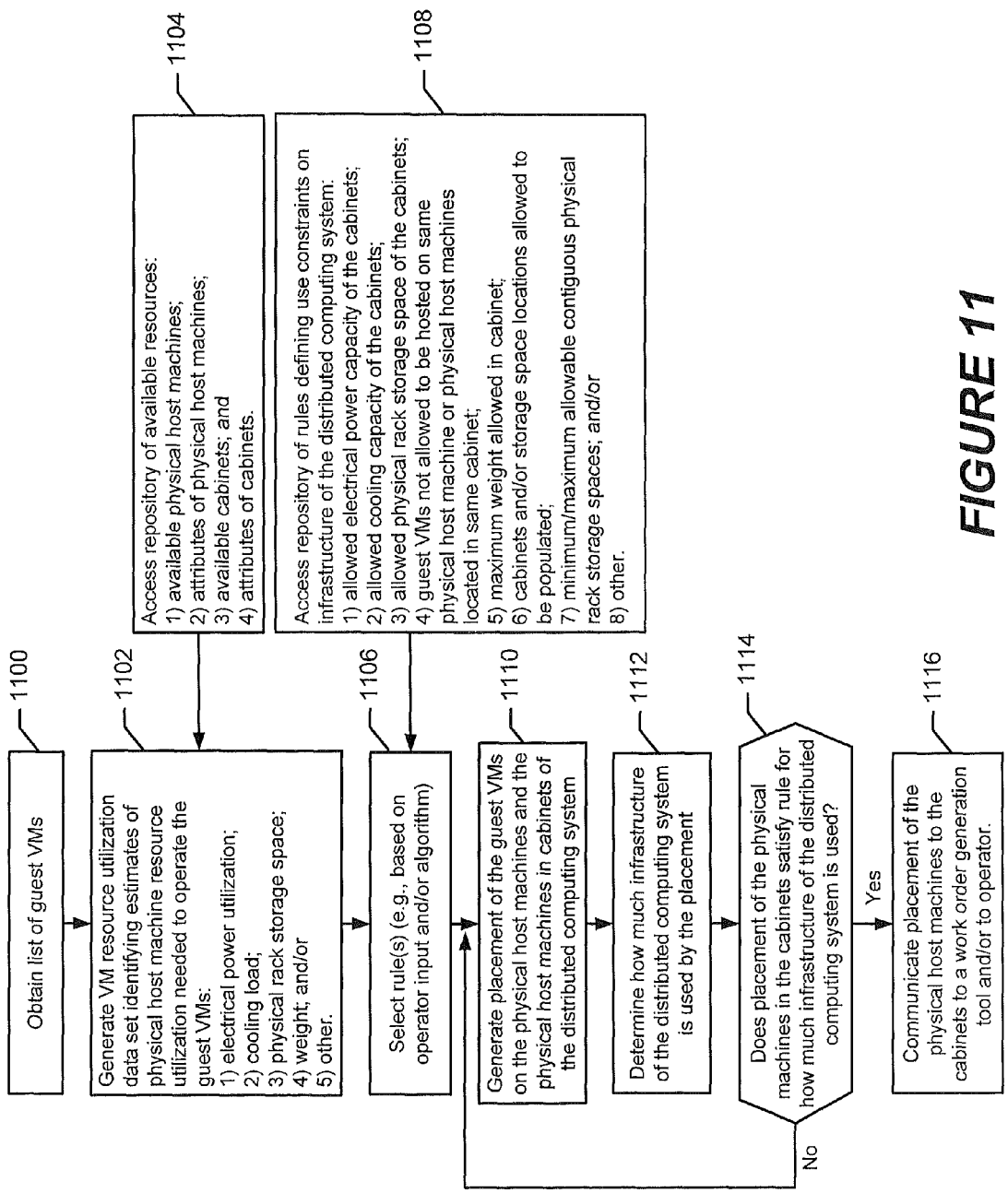
FIG. 11 is a flowchart that illustrates operations for determining placement of VMs on physical host machines and placement of physical host machines in cabinets of a data center that satisfies a defined rule according to some embodiments.

Generating Placement Scenarios for Placing Guest VMs on Physical Host Machines and Placing Physical Host Machines in Cabinets Based on Infrastructure Utilization FIG. 11 is a flowchart that illustrates operations by a resource management node for determining placement of guest VMs on physical host machines and placement of physical host machines in cabinets of a data center that satisfies one or more defined rules, according to some embodiments.

Referring to FIG. 11, the resource management node obtains (block 1100) a list of guest VMs that are available for placement onto physical host machines. The guest VMs can include guest VMs that are already being hosted on physical host machines located in some of the cabinets, and which are to be analyzed for relocation to other physical host machines that are already installed in some of the cabinets or which can be installed in the cabinets. The guest VMs may alternatively or additionally include guest VMs that are not yet hosted on physical host machines located in any of the cabinets, and which are to be analyzed for installation onto physical host machines residing in some of the cabinets or which can be installed in the cabinets. The list of guest VMs may be obtained from a repository of guest VM information.

The resource management node can access (block 1104) a repository of available resources that can identify physical host machines, attributes of the physical host machines, available cabinets, and attributes of the cabinets.

The attributes of the physical host machines may include electrical power consumption, cooling consumption, physical rack storage space, weight, processing capacity, memory capacity, nonvolatile mass data storage capacity, communication input/output capacity, available application resource (e.g., what types and how many applications programs), and other resources that can be used/consumed to host the guest VMs. The attributes may be defined by an operator or manufacturer, and/or may be determined based on measurements during operation of the physical host machines. For physical host machines that are already installed in the cabinets, the attributes may indicate the remaining resources that are presently available for hosting guest VMs. In contrast, for physical host machines that are not yet installed in the cabinets, the attributes may indicate manufacturer/operator defined resources or earlier measured attributes of resources that are available for hosting guest VMs. Some attributes of the physical host machines may be determined based on information provided by a Data Center Infrastructure Managemen™ (DCIM) tool by CA Technologies.

The attributes of the cabinets may include total capacity for supplying electrical power (e.g., circuit breaker capacity) and/or remaining available capacity for supplying electrical power in view of presently installed physical host machines (e.g., identify particular circuit breakers having identified remaining capacity), total cooling capacity and/or remaining available cooling capacity for providing cooling to physical host machines, total weight capacity and/or remaining available weight capacity for supporting physical host machines on racks, total physical storage spaces (e.g., defined unit-spaces "U-spaces") and/or remaining physical storage spaces for installation of physical host machines, configuration and characteristics of physical storage spaces, and other capacities of the cabinets usable by physical host machines. Some attributes of the cabinets may be determined based on information provided by the DCIM tool by CA Technologies.

The resource management node uses the attributes of the physical host machines and the attributes of the cabinets to generate (block 1102) a VM resource utilization data set that identifies estimates of physical host machine resource utilization that is needed to operate each of the guest VMs and/or clusters of VMs. The data set can include, for example, electrical power, cooling, physical rack storage space, weight, processing, memory, nonvolatile mass data storage, communication input/output, application resource (e.g., what types and how many applications programs), and other resources that each of the guest VMs or clusters of guest VMs are estimated to utilize (e.g., consume, occupy, etc) when operating and/or available for operation. The attributes may further include estimated costs for installing and setting-up physical host machines (e.g., acquisition costs and/or human operator time costs), estimated time delay until physical host machines can be installed (e.g., based on available work schedule of human operator), estimated time delay for physical host machines to be started-up to become operational after installation, and/or estimated operational costs of physical host machines. The resource management node may obtain some of the information used to generate the data set from the DCIM tool and/or a Capacity Management™ (CAPMAN) tool by CA Technologies.

Estimation of the physical host machine resource utilization needed to operate each of the guest VMs and/or clusters of VMs can be based on known relationships between the guest VMs and/or clusters of VMs and known and/or observed resources of the physical host machines that are consumed for their host. For example, video encoding applications can have greater defined resource utilization than word processing applications because of their defined/observed higher processor workload and data storage device input/output bandwidth requirements. The relationships may be developed by data collection processes that can include monitoring effects that different observed guest VM loading and/or VM cluster loading has on the resources and infrastructure requirements of the physical host machines, such as the electrical power consumption, cooling, and/or physical rack storage space use by the physical host machines to provide processing and other resources for the guest VMs and/or VM clusters. The guest VMs may be characterized based on the particular application programs and/or operational functionality they are performing or will be performing.

The resource management node can access (block 1108) a repository of rules defining constraints on the infrastructure of the distributed computing system (e.g., resources of the cabinets and physical host machines) that can be used to host the guest VMs. The rules may include, but are not limited to, defining one or more of the following:

1) allowed electrical power capacity of the cabinets to be consumed (e.g., defined margin below the maximum electrical power capacity of the cabinet or rack therein);

2) allowed cooling capacity of the cabinets to be consumed (e.g., defined margin below the maximum cooling capability of the cabinet or rack therein);

3) allowed occupation of physical storage locations in racks of cabinets (e.g., defined margin below the available storage locations);

4) identification of particular guest VMs that are not allowed to be simultaneously hosted on the same physical host machine, located on the same cabinet rack, located in the same cabinet, and/or located in the same data center facility (e.g., to provide greater fault tolerance in case of failure of cabinet resources, to provide increased security isolation between datasets used by VMs, etc);

5) weight capacity of the cabinets allowed to be used (e.g., defined margin below the maximum weight support capacity of cabinets);

6) identification of cabinets and/or storage space locations allowed to be populated with physical host machines;

7) minimum/maximum allowable contiguous physical storage locations allowed to be used by physical host machines; and 8) other.

The resource management node selects (block 1106) one or more of the rules based on operator input, an algorithm, and/or a defined selection rule. The rule(s) may be selected to, for example, minimize power consumption, minimize storage space utilization in defined cabinet rack locations or more generally anywhere in one of more defined cabinets (e.g., minimize used U-space, minimize contiguous U-space to spread out heat dissipation within a cabinet/rack), minimize cooling consumption, minimize hardware cost, minimize software application cost, minimize operating and/or maintenance costs, minimize use of defined types of physical host machines, minimize use of defined type/class of cabinet rack, increase reliability (e.g., high availability policy(ies)), and/or increase operational performance (e.g., processing bandwidth and responsiveness) of guest VMs.

The resource management node generates (block 1110) a placement scenario for placing guest VMs on the physical host machines and placement of the physical host machines in the cabinets of the data center or other distributed computing system. The placement scenario may include installing defined physical host machines (e.g., which are presently located in any of the cabinets) and/or relocating defined physical host machines (e.g., which are presently located in any of the cabinets) to defined locations in the cabinets, and installing new guest VMs and/or relocating defined guest VMs to defined ones of the physical host machines. The placement scenario may additionally include reconfiguring existing physical host machines to provide different resources for hosting some of the guest VMs.

How much infrastructure of the data center or other distributed computing system is used by the placement scenario is determined (block 1112). The determination (block 1112) may include repeating some of the estimation processes described above (block 1102) but now directed to the placement scenario for how guest VMs are proposed to be mapped to physical host machines and how physical host machines are proposed to mapped to cabinets.

A decision (block 1114) is made whether the placement scenario for placing guest VMs on the physical host machines and placement of the physical host machines in the cabinets of the data center or other distributed computing system satisfies the selected rule(s). If the selected rule(s) was not satisfied, the operations of blocks 1110-1114 are recursively repeated to generate (block 1110) another placement scenario, determine (block 1112) an amount of infrastructure of the data center or other distributed computing system used by the placement scenario, and determine whether the selected rule(s) is satisfied or another rule for terminating the recursive process is satisfied.

When the selected rule is satisfied or the recursive process is otherwise terminated, the placement scenario is communicated (block 1116) to a work order generation tool to generate a work order that lists physical host machines to be installed or relocated to, and/or decommissioned (e.g., removed) from, defined locations in the cabinets and lists guest VMs to be installed or relocated to, and/or decommissioned (e.g., removed) from, defined physical host machines. The work order may be physically carried out by a human operator and/or may be at least partially carried out by automated computer processes to install and/or relocate guest VMs and/or to decommission physical host machines (e.g., shut-down, trigger lower-power idle state, etc.).

After completion of the work order, a repository of system information (e.g., the resource parameter repository 154) may be automatically updated (e.g., by the automated computer processes) and/or manually updated by a human operator with information that identifies the new system configuration. The information may, for example, identify the guest VMs, identify which physical host machines are hosting the guest VMs, and/or identify which physical host machines reside in which of the cabinets and/or racks.

Displaying Estimated Effect of Placement Scenario on Infrastructure Use

Figure 12:
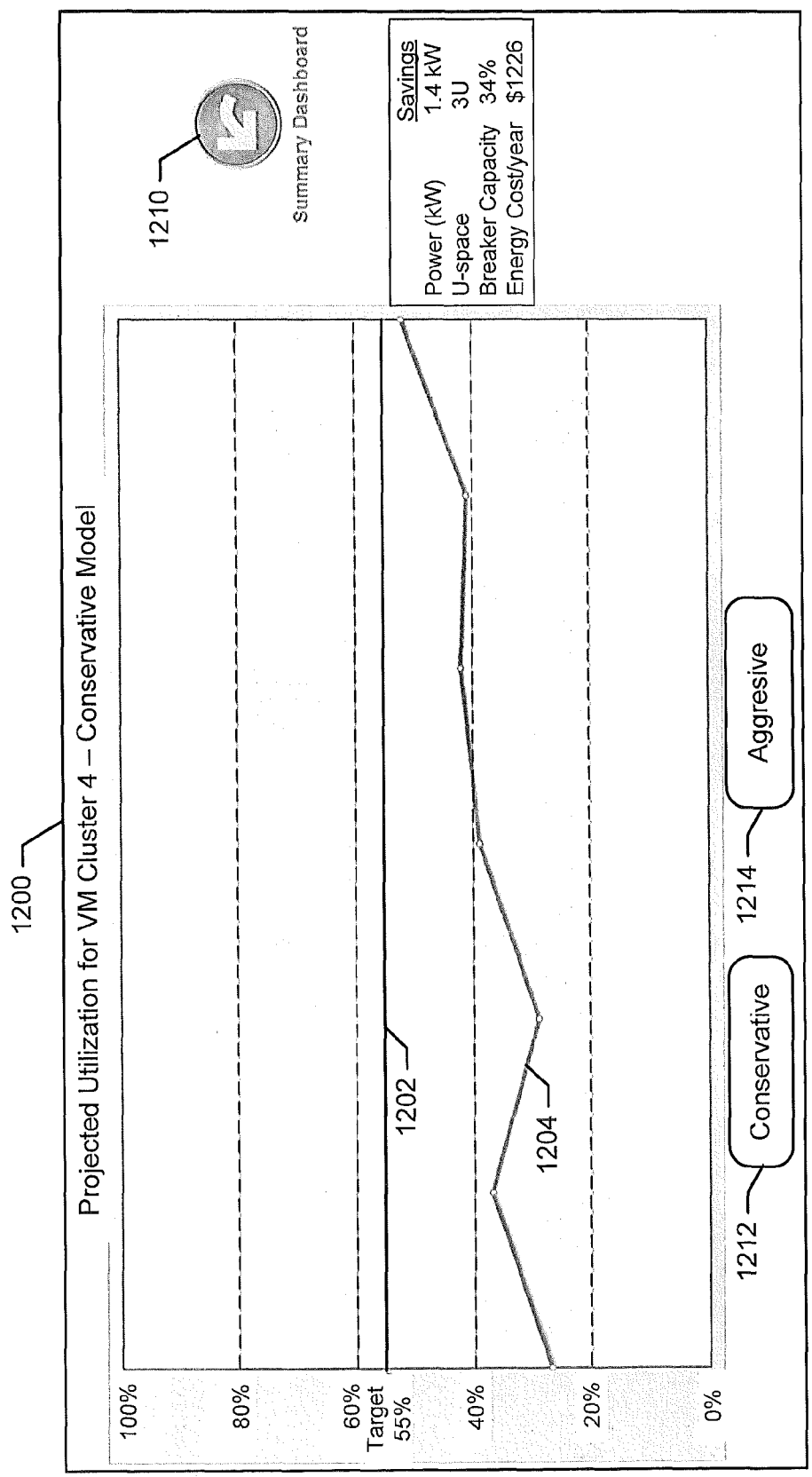
FIG. 12 illustrates information that may be displayed to inform an operator of the estimated impact that implementation of a guest VM and physical host machine placement scenario can have on infrastructure utilization of one or more cabinets of a distributed computer system according to some embodiments.

FIG. 12 illustrates an informational window 1200 that may be displayed to inform an operator regarding the estimated impact that implementation of a guest VM and physical host machine placement scenario can have on infrastructure utilization of one or more cabinets of a distributed computer system over time, according to some embodiments. In FIG. 12, a preferred (targeted) utilization level for a cluster of defined VMs ("VM Cluster 4") is 55 percent (illustrated as line 1202). With a conservative placement model (e.g., selected rules that seek to minimize changes to the cabinets) for mapping guest VMs to physical host machines and mapping physical host machines to storage spaces in cabinets, the resource management node projects (estimates) that the infrastructure utilization by the VM cluster will follow the utilization graph values of line 1204 over time. The utilization may refer to electrical power consumption, cooling consumption, remaining power capacity, remaining cooling capacity, other infrastructure available from the cabinets, or a combination thereof. Thus for example, the resource management node may combine estimates of power, cooling, capacity, etc (e.g., according to a defined weighting scheme for the different resource attributes) to obtain a value that is graphed.

Moreover, the resource management node estimates that implementation of the conservative placement model will result in infrastructure savings in the distributed computing system of 1.4 kW of electrical power, savings of 3 physical rack storage spaces (U-space), 34 percent increase in circuit breaker capacity, and $1226 savings per year in energy costs.

A user may select a user selectable indicia 1212 to trigger the conservative placement model operations to generate a placement scenario and determine the utilization and infrastructure savings that may be obtained by performing the conservative placement model. A user may alternatively select another user selectable indicia 1214 to trigger execution of an aggressive placement model (e.g., selected rules that seek to maximize infrastructure savings with less regard to minimizing changes to the cabinets), which can generate a placement scenario that performs greater changes to the cabinets including placement of new guest VMs on physical host machines already installed in the cabinets, relocation of other guest VMs to other physical host machines installed in the cabinets, and installation of new physical host machines and installation of guest VMs thereon.

A user may select another user selectable indicia 1210 to define other rules (e.g., block 1106 in FIG. 11) or select among existing rules (e.g., block 1108 in FIG. 11) to guide generation of further placement scenarios with associated display of projected infrastructure utilization and estimation of savings.

Example Implementation of a Generated Placement Scenario

As explained above, when an acceptable placement scenario is identified, the placement scenario can be communicated (block 1116 in FIG. 11) to a work order generation tool to generate a work order that lists physical host machines to be installed or relocated to defined locations in the cabinets and lists guest VMs to be installed or relocated to defined physical host machines. The work order may be physically carried out by a human operator and/or may be at least partially carried out by automated computer processes to install and/or relocate guest VMs and/or to shut-down physical host machines.

Figure 13:
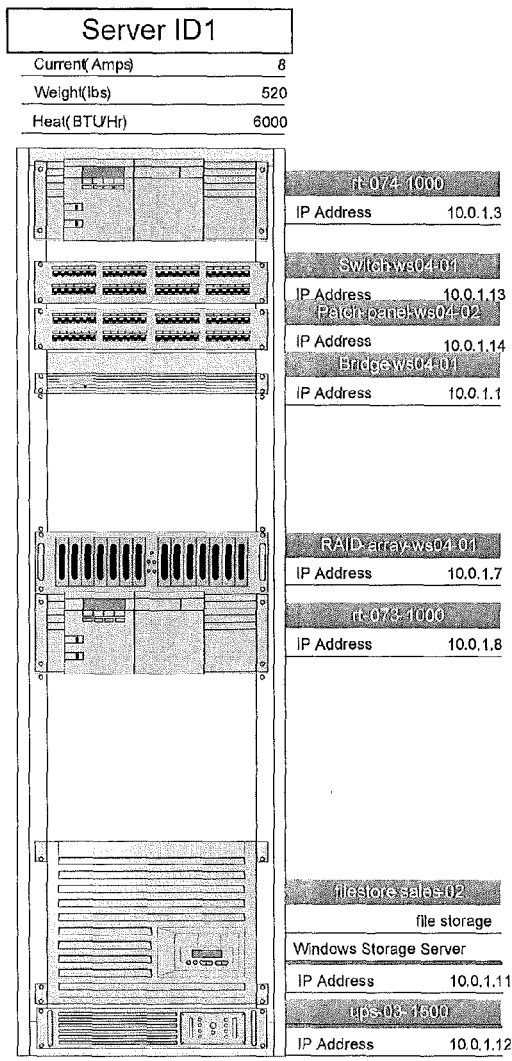
FIGS. 13 and 14 illustrates a cabinet before implementation of VM and physical host machine placement scenarios and after implementation of guest VM and physical host machine placement scenarios, respectively, according to some embodiments.
Figure 14:
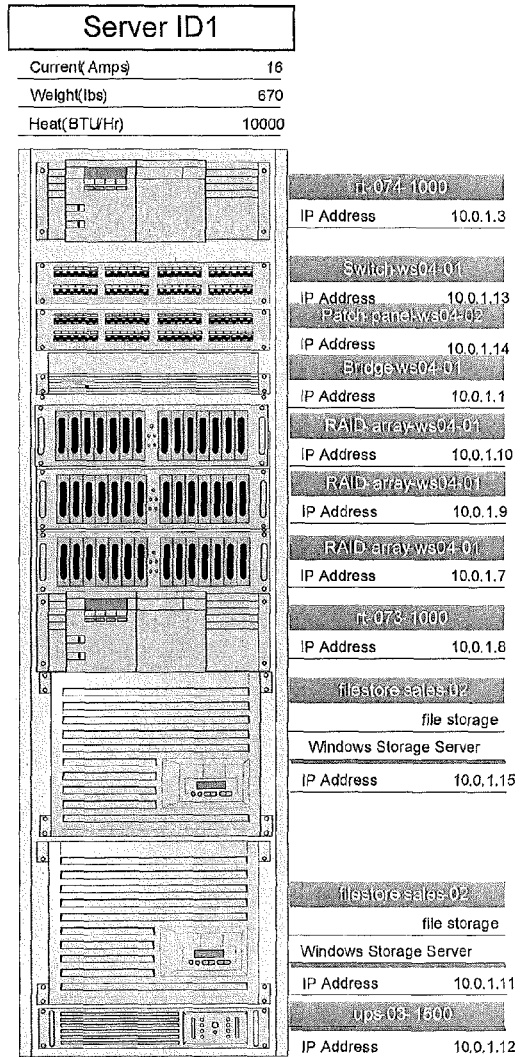

FIG. 13 illustrates a cabinet labeled "Server ID1" before implementation of a guest VM and physical host machine placement scenario. In contrast, FIG. 14 illustrates the cabinet of FIG. 14 after implementation of the guest VM and physical host machine placement scenario. The work order has identified that two particular physical host machines are to be added to identified storage locations in the cabinet. In the present example placement scenario, two "RAID-array" storage devices have been identified for being added to a defined slot associated with IP addresses 10.0.1.9 and 10.0.1.10, and a "filestore" storage device has been identified for being added to another defined slot associated with IP address 10.0.1.15.

The resource management node measured or otherwise determined (e.g., based on attributes defined in the repository 1104) that the server cabinet has been supplying 8 amps of current to the physical host machines, supporting 520 pounds of physical host machines, and providing 6000 BTU/hr of heat dissipation to the physical host machines before implementation of the guest VM and physical host machine placement scenario. The resource management node has also estimated that implementation of the guest VM and physical host machine placement scenario would cause the server cabinet to supply 16 amps of current to the physical host machines, support 670 pounds of physical host machines, and provide 10000 BTU/hr of heat dissipation to the physical host machines.

Accordingly, the example placement scenario of FIGS. 13 and 14 increases the infrastructure utilization of the Server ID1 cabinet. Although implementation of the placement scenario may result in greater infrastructure utilization in the illustrated cabinet, savings may be obtained in other cabinets by, for example, allowing relocation of guest VMs from physical host machines in the other cabinets to the reconfigured Server ID1 cabinet and associated decommissioning of those physical host machines in the other cabinets. The resource management node may estimate and display the infrastructure savings in each of the other affected cabinets and/or a combined infrastructure savings. Other savings may be obtained by minimizing the number of physical host machines or optimizing the selected types of physical host machines added to the Server ID1 cabinet to support a list of new guest VMs to be installed therein.

Further Operations by a Resource Management Node

Figure 15:
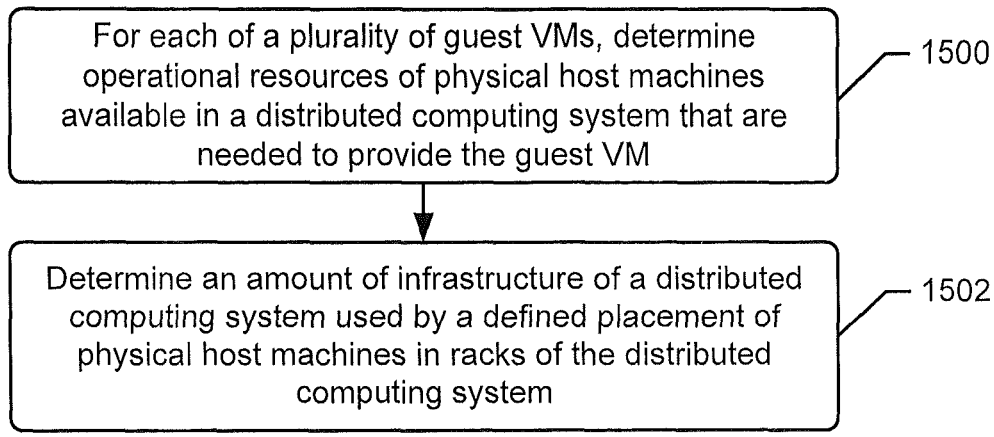
Figure 16:
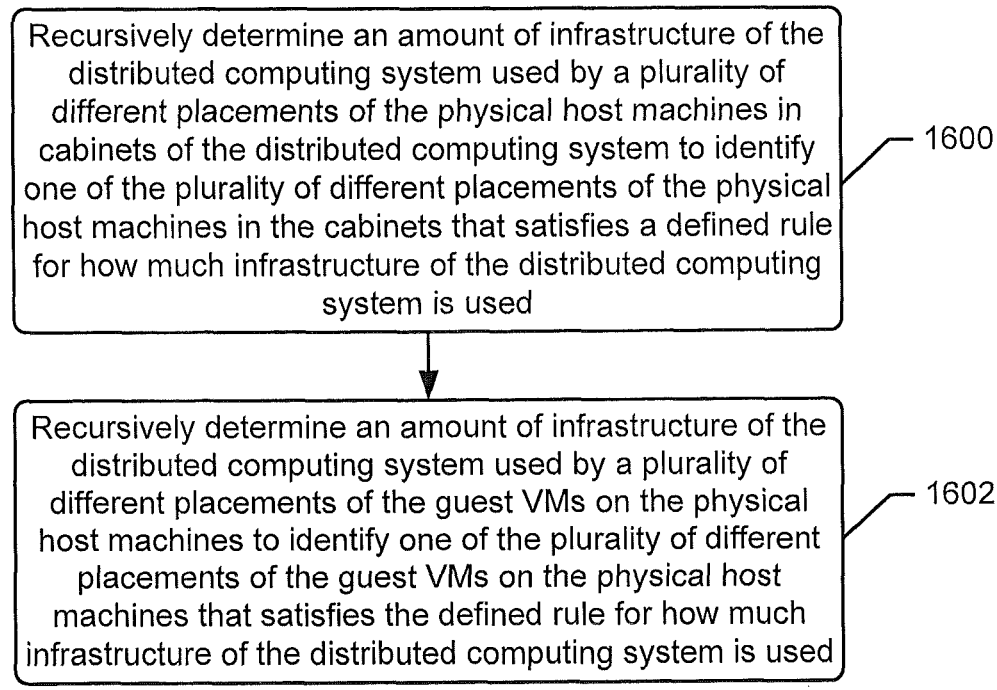

FIGS. 15-17 are flowcharts that illustrate other operations for determining placement of guest VMs on physical host machines and placement of physical host machines in cabinets of a data center that satisfies a defined rule according to some embodiments. As explained above regarding FIG. 4, the resource management node can include a processor and a memory coupled to the processor. The memory includes computer readable program code that when executed by the processor causes the processor to perform operations.

Referring to FIG. 15, the operations can include, for each of a plurality of guest VMs, determining (block 1500) operational resources of physical host machines available in a distributed computing system that are needed to provide the guest VM. The operations further include determining (block 1502) an amount of infrastructure of a distributed computing system used by a defined placement of physical host machines in racks of the distributed computing system.

Referring to FIG. 16, the operations can include recursively determining (block 1600) an amount of infrastructure of the distributed computing system used by a plurality of different placements of the physical host machines in cabinets of the distributed computing system to identify one of the plurality of different placements of the physical host machines in the cabinets that satisfies a defined rule for how much infrastructure of the distributed computing system is used. The operations can further include recursively determining (block 1602) how much infrastructure of the distributed computing system is used by a plurality of different placements of the guest VMs on the physical host machines to identify one of the plurality of different placements that satisfies the defined rule for how much infrastructure of the distributed computing system is used.

The operations for determining an amount of infrastructure used by different placements can include looking at how much power, cooling, and/or storage space would be used. For example, referring to FIG. 17, the operations can include recursively determining (block 1700) an amount of electrical power capacity of the cabinets, an amount of cooling capacity of the cabinets, and/or an amount of physical rack storage space of the cabinets used by the plurality of different placements of the physical host, machines in the cabinets of the distributed computing system to identify one of the plurality of different placements that satisfies a defined rule for how much electrical power capacity of the cabinets, how much cooling capacity of the cabinets, and/or how much physical rack storage space of the cabinets is allowed to be used.

Generating a Relocation Scenario for Unproductive Guest VMs and Selectively Relocating the Unproductive Guest VMs Based on Estimated Effect of the Relocation Scenario Some further embodiments are directed to improving infrastructure utilization by identifying guest VMs being hosted on physical host machines that are inefficiently consuming infrastructure of a distributed computing system, and relocating the guest VMs to other physical host machines to allow decommissioning of the physical host machines that previously hosted the guest VMs. The decommissioning may include removing the physical host machines from their cabinets, thereby freeing up physical storage spaces and reducing electrical power consumption and cooling consumption in the cabinets. The decommissioning may alternatively include transitioning the physical host machines from an on-line higher power state (which supports host processing of guest VMs) to an off-line lower power state (which does not support host processing of guest VMs) to reduce the electrical power consumption and cooling consumption in the cabinets.

More particularly, the operations can include identifying an unproductive group of guest VMs, generating a relocation scenario for the unproductive group of guest VMs, estimating an effect of the relocation scenario on infrastructure usage, and selectively relocating the unproductive group of guest VMs based on the relocation scenario and its estimated effect on infrastructure usage.

Figure 18:
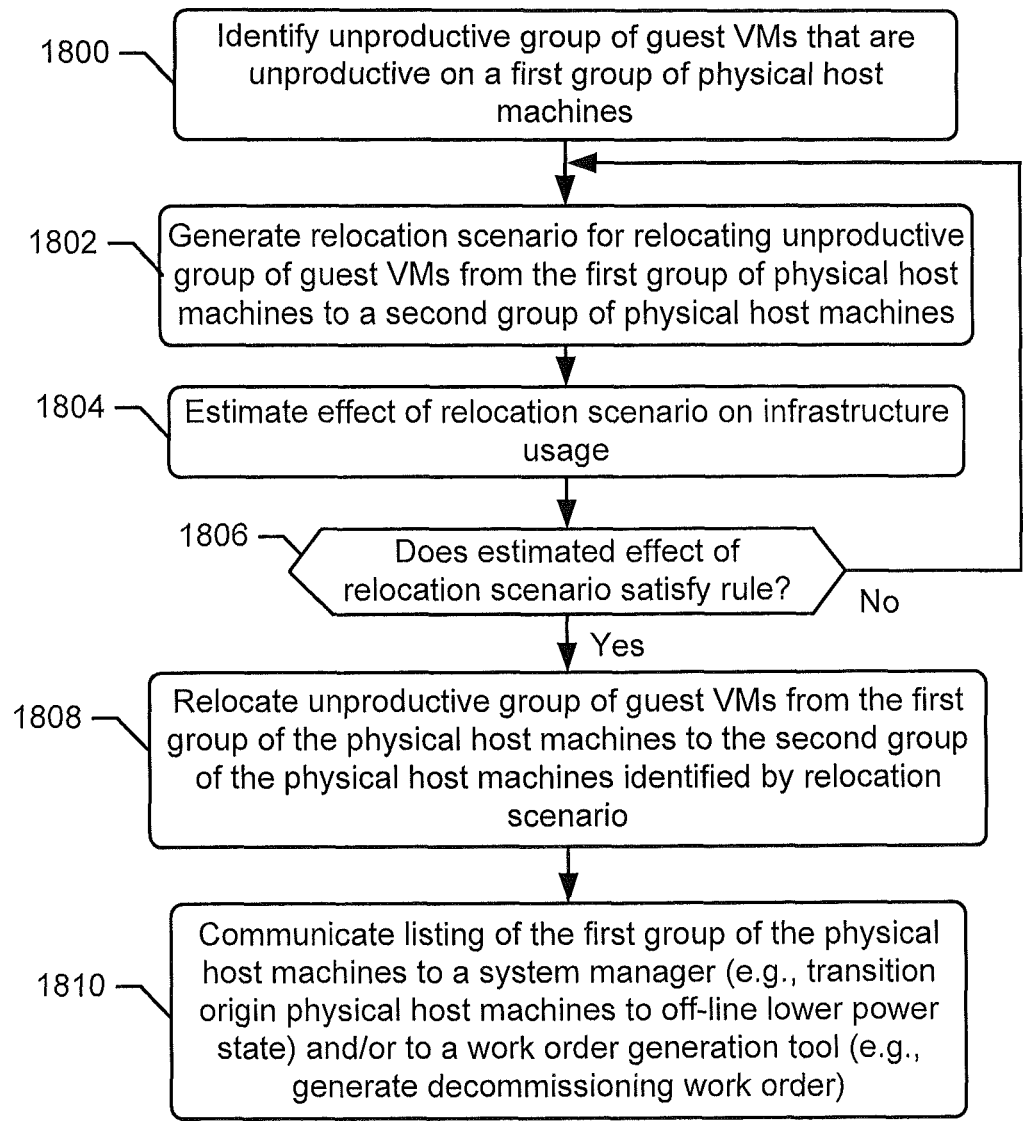
FIG. 18 is a flowchart that illustrates operations for identifying an unproductive group of guest VMs, generating a relocation scenario for the unproductive group of guest VMs, estimating an effect of the relocation scenario on infrastructure usage, and relocating the unproductive group of guest VMs based on the relocation scenario according to some embodiments.

FIG. 18 is a flowchart that illustrates example operations that can be performed by a resource management node. Referring to FIG. 18, the operations include identifying (block 1800) an unproductive group of guest VMs that satisfy a defined rule for being unproductive on physical host machines based on infrastructure of a distributed computing system used by the physical host machines to host the guest VMs. Identification of the unproductive group of guest VMs may be performed using one or more of the operations of block 802 and blocks 812-816 illustrated in FIG. 8 and explained above.

Further to the explanation above, one approach for identifying an unproductive group of guest VMs can include, for each of the guest VMs, determining a productivity metric for the guest VM based on resources of the physical host machine that are used to host the guest VM (e.g., processor utilization, memory utilization, communication bandwidth utilization, etc.). An infrastructure value, which indicates how much infrastructure of the distributed computing system is attributed to providing the guest VM, is determined based on the productivity metric for the guest VM. The guest VM is added to the unproductive group if the infrastructure value does not satisfy a defined utilization rule for using at least a threshold amount of infrastructure of the physical host machine.

Additionally or alternatively, when identifying an unproductive group of guest VMs comprises, guest VMs can be added to the unproductive group if one or more of the following conditions is determined to be satisfied: 1) the guest VM does not use at least a threshold amount of resources of the physical host machine to provide the guest VM; 2) the guest VM does not satisfy a defined user relevance rule for providing at least a threshold level of client service to users; and/or 3) and/or the guest VM performs overhead services for operating other guest VMs on the physical host machine.

The group of physical host machines that is presently hosting the unproductive group of guest VMs is also referred to as a "first group" of the physical host machines, while another group of physical host machines to which the unproductive group of guest VMs may be later relocated according to a relocation scenario is referred to for convenience as a "second group" of the physical host machines. Use of the terms "first" and "second" denotes that at least one of the physical host machines is different between the two groups. When the relocation scenario is used to decommission the first group of the physical host machines for removal from cabinets, the first and second groups may contain no common physical host machines to allow removal of all of the physical host machines in the first group after relocation of the guest VMs to the physical host machines in the second group.

A relocation scenario is generated (block 1802) for relocating the unproductive group of guest VMs from the first group of the physical host machines to a second group of physical host machines. The relocation scenario may be generated based on operations that determine what resources (e.g., processing capacity, memory capacity, disk input/output capacity, disk storage capacity, network interface bandwidth capacity, etc.) are available on other physical host machines residing in cabinets that are presently available for hosting the unproductive group of guest VMs. FIG. 19 illustrates information that can be logically organized to generate a guest VM relocation scenario according to some embodiments. Referring to FIG. 19, the relocation scenario can include identifiers for each of the guest VMs in the unproductive group that is to be relocated, characteristics of the guest VMs (e.g., information used by a physical host machine of the second group to load, set up, and/or process defined ones of the guest VMs), identifiers for the first group of the physical host machines, and/or identifiers for the physical host machines of the second group.

An effect of the relocation scenario on usage of infrastructure (e.g., electrical power consumption, cooling consumption, etc.) of the distributed computing system is estimated (block 1804). The unproductive group of the guest VMs is relocated (block 1808) from the first group of the physical host machines to the second group of the physical host machines based on the relocation scenario.

Relocation (block 1808) of the unproductive group of the guest VMs may be selectively performed based on a decision (block 1806) whether the estimated effect of the relocation scenario satisfies a defined rule. The operations for generating (block 1802) a relocation scenario and estimating (block 1804) an effect of the relocation scenario on usage of infrastructure the distributed computing system can be recursively performed until one of relocation scenarios satisfies a defined rule for how much infrastructure of the distributed computing system is used. The defined rule may, for example, constrain electrical power capacity and/or cooling capacity that can be used in the cabinets, and/or may constrain which guest VMs are allowed to be simultaneously hosted on the same physical host machine.

In one embodiment, relocation (block 1808) of the unproductive group of the guest VMs from the first group of the physical host machines to the second group of the physical host machines can be performed based on one of the relocation scenarios that satisfies a defined rule for how much electrical power capacity of cabinets, which supply power to physical host machines of the distribute computing system, is allowed to be used. Estimation (block 1804) of the effect the relocation scenario on usage of infrastructure may include estimating electrical power consumption of the distributed computing system that will be decreased by decommissioning the first group of the physical host machines. Relocation (block 1808) of the unproductive group of the guest VMs from the first group of the physical host machines to the second group of the physical host machines may be performed in response to the electrical power consumption of the distributed computing system decreasing a threshold amount.

In another embodiment, relocation (block 1808) of the unproductive group of the guest VMs from the first group of the physical host machines to the second group of the physical host machines can be performed based on one of the relocation scenarios that satisfies a defined rule for how much cooling capacity of cabinets, which cool physical host machines of the distributed computer system, is allowed to be used. Estimation (block 1804) of the effect the relocation scenario on usage of infrastructure may include estimating cooling capacity of the distributed computing system that will be increased by decommissioning the first group of the physical host machines. Relocation (block 1808) of the unproductive group of the guest VMs from the first group of the physical host machines to the second group of the physical host machines may be performed in response to the cooling capacity of the distributed computing system increasing a threshold amount.

In another embodiment, relocation (block 1808) of the unproductive group of the guest VMs from the first group of the physical host machines to the second group of the physical host machines can be performed based on one of the relocation scenarios that satisfies a defined rule for how physical storage capacity of the cabinets is increased. Estimation (block 1804) of the effect of the relocation scenario on usage of infrastructure may include estimating physical storage space capacity of cabinets in the distributed computing system that will be increased by removal of the first group of the physical host machines from the cabinets. Relocation (block 1808) of the unproductive group of the guest VMs from the first group of the physical host machines to the second group of the physical host machines may be performed in response to the physical storage space capacity of cabinets in the distributed computing system increasing a threshold amount.

In another embodiment, relocation (block 1808) of a pair of the guest VMs to different ones of the second group of the physical host machines can be performed based on one of the relocation scenarios that satisfies a defined rule identifying that the pair of the guest VMs are not allowed to be simultaneously hosted on a same physical host machine. For example, if a relocation scenario would relocate a pair of guest VMs onto a same physical host machine when that pair of guest VMs is not allowed to be simultaneously hosted on the same physical host machine, the relocation scenario may not be performed to relocate at least the pair of guest VMs.

A listing of the first group of the physical host machines for decommissioning can be communicated (block 1810) based on completing relocation of the unproductive group of the guest VMs from the first group of the physical host machines to the second group of the physical host machines. The listing of the first group of the physical host machines may be communicated to the system manager that performs operations to transition the first group of the physical host machines from an on-line higher power state (which supports host processing of guest VMs) to an off-line lower power state (which does not support host processing of guest VMs) to reduce the electrical power consumption and cooling consumption in the cabinets.

Alternatively or additionally the listing may be communicated to a work order generation tool that generates a decommissioning work order. FIG. 21 illustrates information that can be included in a decommissioning work order. The decommissioning work order can include information identifying physical storage locations (e.g., cabinet identifier, rack/location identifier) of the first group of the physical host machines to be removed by an operator, and may further identify a network physical port connected to a network cable of the first group of the physical host machines to be removed and a power physical port connected to a power cable of the first group of the physical host machines to be removed. The decommissioning work order may include information that identifies a physical host characteristic (e.g., model identifier) for a physical host machine, which may facilitate operator procedures for identifying and/or removing the physical host machine, and a network address for a physical host machine, which may facilitate network management operations relating to removal of physical host machines.

Example Implementation of Decommissioning of Physical Host Machines Based on Relocation Scenario As explained above, when an acceptable relocation scenario is identified, the relocation scenario can be used by the resource management node and/or another management component of the distributed computer system to relocate (block 1808 in FIG. 18) the unproductive group of the guest VMs from the first group of the physical host machines to the second group of the physical host machines based on the relocation scenario. A listing of the first group of the physical host machines for decommissioning can be communicated (block 1810 in FIG. 18) to a work order generation tool to generate a work order that lists physical host machines to be removed from defined locations in the cabinets. The work order may be physically carried out by a human operator and/or may be at least partially carried out by automated computer processes to transition physical host machines to an off-line lower power state.

FIG. 21 illustrates a cabinet labeled "Server ID1" before decommissioning of physical host machines based on a relocation scenario. In contrast, FIG. 14 illustrates the cabinet of FIG. 14 after decommissioning some of the physical host machines based on the relocation scenario. The work order generated from the relocation scenario identified that two particular physical host machines are to be removed from identified storage locations in the cabinet. In the present example placement scenario, a physical host machine identified as "RAID-array" has been identified for being removed from a defined slot associated with IP addresses 10.0.1.10, and another physical host machine identified as "filestore" storage device has been identified for being removed from a defined slot associated with IP addresses 10.0.1.15.

Removal of the two physical host machines from the "Server ID1" cabinet can beneficially decrease electrical power consumption while increasing electrical capacity of the cabinet, decrease cooling consumption while increasing cooling capacity of the cabinet, and increase available physical storage locations in the cabinet. Moreover, relocating the guest VMs from the two physical host machines of the "Server ID1" cabinet to other physical host machines in the same or different cabinet can result in more effective resource utilization of the other physical host machines and more effective infrastructure utilization by the other physical host machines. For example, for a given amount of resources and infrastructure used by overhead processes relating to hosting guest VMs, relocating more guest VMs to a physical host machine to increase the relative amount of resources and infrastructure that is attributed to processing guest VMs versus overhead processes can increase the efficiency of the physical host machine and associated distributed computing system.

Figure 23:
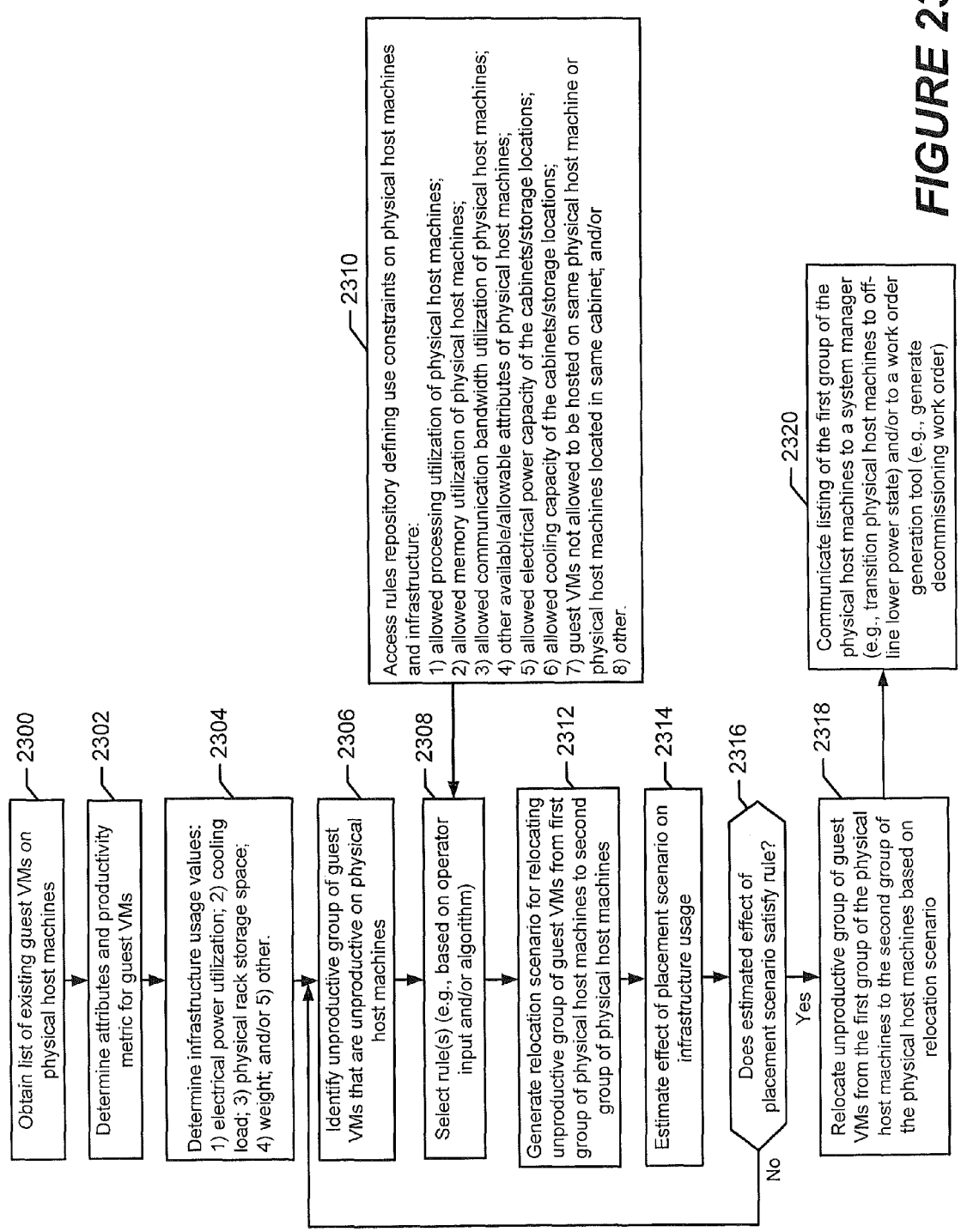
FIG. 23 is a flowchart that illustrate other operations for identifying an unproductive group of guest VMs, generating a relocation scenario for the unproductive group of guest VMs, estimating an effect of the relocation scenario on infrastructure usage, and relocating the unproductive group of guest VMs based on the relocation scenario, according to some embodiments.

Further Operations for Generating a Relocation Scenario and Selectively Relocating Unproductive Guest VMs FIG. 23 is a flowchart that illustrate other operations that may be performed by a resource management node for identifying an unproductive group of guest VMs, generating a relocation scenario for the unproductive group of guest VMs, estimating an effect of the relocation scenario on infrastructure usage, and relocating the unproductive group of guest VMs based on the relocation scenario according to some embodiments.

Referring to FIG. 23, a list of existing guest VMs that are being hosted on physical host machines is obtained (block 2300). Attributes of the guest VMs and a productivity metric for the guest VMs is determined (block 2302) based on resources of the physical host machine are used by the guest VMs, which may be performed according to one or more of the operations described above for block 802 of FIG. 8.

Infrastructure usage values can be determined (block 2304) according to one or more the operations described above for blocks 812-816 of FIG. 8, The infrastructure usage values may identify the electrical power consumption, cooling consumption, physical rack storage space, weight, and/or other infrastructure used by the physical host machines that is attributed to the guest VMs.

An unproductive group of guest VMs that is unproductive on physical host machines is identified (block 2306) based on the productivity metrics and/or the infrastructure usage values, which may be performed using one or more of the operations described above with regard to blocks 802 and 812-816 of FIG. 8 and/or block 1800 of FIG. 18.

The resource management node can access (block 2310) a repository of rules defining use constraints on the physical host machines and the infrastructure of the distributed computing system that can be used to host the guest VMs. The rules may include, but are not limited to, defining one or more of the following:

1) processor utilization of the physical host machines allowed to be used by the guest VMs;

2) memory utilization of the physical host machines allowed to be used by the guest VMs;

3) communication bandwidth of the physical host machines allowed to be used by the guest VMs;

4) other available/allowable attributes of physical host machines allowed to be used by the guest VMs;

5) electrical power capacity of the cabinet/storage locations allowed to be used by the guest VMs;

6) cooling capacity of the cabinet/storage locations that allowed to be used by the guest VMs;

7) guest VMs that are not allowed to be simultaneously hosted on a same physical machine or on physical host machines located in a same cabinet; and 8) other.

The resource management node selects (block 2308) one or more of the rules based on operator input, an algorithm, and/or a defined selection rule. A relocation scenario for relocating the unproductive group of guest VMs from the first group of the physical host machines to a second group of the physical host machines is generated (block 2312) based on the selected one or more rules. An effect of the relocation scenario on infrastructure usage is estimated (block 2314). The estimation (block 2314) may include repeating some of the estimation processes described above (blocks 1102 and 1112) but which now are directed to the relocation scenario for how guest VMs are proposed to be mapped to physical host machines in the cabinets.

The rule(s) may be selected (block 2308) so that when the relocation scenario is carried out to relocate the unproductive group of guest VMs to the second group of the physical host machines, the second group of the physical host machines will have sufficient processor throughput, memory capacity, communication capacity, and/or other resource capabilities to support processing of the guest VMs. Moreover, the rules can be defined so that after relocation of the guest VMs, the cabinet has sufficient electrical power capacity, cooling capacity, and/or other attributes to support operation of the physical host machines while processing the guest VMs. The rules may provide a desired distribution of power consumption and/or cooling consumption across the cabinet so as to, for example, avoid generation of elevated temperature hotspots within the cabinet or providing elevated temperature hotspots within a defined distance of particular physical host machines that are known to be susceptible to temperature induced failure.

A decision (block 2316) is made whether the relocation scenario for relocating guest VMs from first group of the physical host machines to the second group of the physical host machines satisfies the selected rule(s). The decision (block 2316) may further be based on an estimate of the infrastructure savings that can be obtained by decommissioning the first group of the physical host machines. If the selected rule(s) was not satisfied, the operations of blocks 2316 can be recursively repeated to generate (block 2312) another relocation scenario, estimate an effect of the relocation scenario on infrastructure usage (block 2314), and determine whether the selected rule(s) is satisfied or another rule for terminating the recursive process is satisfied.

When the selected rule is satisfied or the recursive process is otherwise terminated, the unproductive group of guest VMs are relocated (block 2318) from the first group of the physical host machines to the second group of the physical host machines based on the relocation scenario.

A listing of the first group of the physical host machines for decommissioning can be communicated (block 2320) based on completing relocation of the unproductive group of the guest VMs. The listing of the first group of the physical host machines may be communicated to a system manager that performs operations to transition the first group of the physical host machines from an on-line higher power state (which supports host processing of guest VMs) to an off-line lower power state (which does not support host processing of guest VMs) to reduce the electrical power consumption and cooling consumption in the cabinets.

Alternatively or additionally the listing may be communicated to a work order generation tool that generates a decommissioning work order for removal of the first group of the physical host machines from the cabinets, such as according to one or more of the operations described above with regard to block 1810 of FIG. 18 and FIGS. 19-22.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, radio frequency (RF), etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method of operating a resource management node comprising:

identifying an unproductive group of guest virtual machines (VMs) that satisfy a defined rule for being unproductive on a first group of physical host machines based on infrastructure of a distributed computing system used by the first group of the physical host machines to host the guest VMs, wherein the identifying comprises:

for each of a plurality of the guest VMs determining a productivity metric for the guest VM based on infrastructure resources of the distributed computing system that are used by execution of the guest VM on the physical host machine, and controlling a time window over which the productive metric is measured based on an elapsed time needed for the physical host machine to transition from start-up to being ready to execute the guest VM and based on observed change in number of VM guests being executed by the physical host machines over a defined time, including increasing the time window over which the productivity metric is measured responsive to a slower start-up indicated by a longer elapsed time and shortening the time window over which the productivity metric is measured responsive to an increase in the number of VM guests being executed by the physical host machines over the defined time; and adding to the unproductive group any of the guest VMs having a productivity metric that does not satisfy a defined utilization rule;

generating a relocation scenario for relocating the unproductive group of the guest VMs from the first group of the physical host machines to a second group of the physical host machines to change utilization of the first group of the physical host machines and change utilization of the second group of the physical host machines;

estimating an effect of the relocation scenario on how much infrastructure of the distributed computing system would be used by the first group of the physical host machines and the second group of the physical host machines if the relocation scenario is performed to relocate the unproductive group of the guest VMs from the first group of the physical host machines to the second group of the physical host machines; and responsive to the estimate of the effect of the relocation scenario on how much infrastructure of the distributed computing system would be used satisfying a defined rule, relocating the unproductive group of the guest VMs from the first group of the physical host machines to the second group of the physical host machines by performing the relocation scenario.

2. The method of claim 1, wherein estimating an effect of the relocation scenario on how much infrastructure of the distributed computing system would be used comprises estimating electrical power consumption of the distributed computing system that will be decreased if the first group of the physical host machines is decommissioned and electrical power consumption by the second group of the physical host machines is increased by processing the unproductive group of the guest VMs; and the relocating the unproductive group of the guest VMs from the first group of the physical host machines to the second group of the physical host machines by performing the relocation scenario, is initiated based on the estimate of the electrical power consumption of the distributed computing system decreasing a threshold amount relative to a present electrical power consumption of the distributed computing system.

3. The method of claim 1, further comprising:
recursively performing the generating a relocation scenario and the estimating an effect of the relocation scenario on how much infrastructure of the distributed computing system would be used until one of relocation scenarios satisfies a defined rule for how much infrastructure of the distributed computing system is allowed to be used.

4. The method of claim 3, further comprising:
relocating the unproductive group of the guest VMs from the first group of the physical host machines to the second group of the physical host machines by performing the one of the relocation scenarios responsive to determining that the one of the relocation scenarios when completed will satisfy a defined rule for how much electrical power capacity of cabinets, which supply power to the second group of the physical host machines of the distribute computing system, is allowed to be used.

5. The method of claim 3, further comprising:
relocating the unproductive group of the guest VMs from the first group of the physical host machines to the second group of the physical host machines by performing the one of the relocation scenarios responsive to determining that the one of the relocation scenarios when completed will satisfy a defined rule for how much cooling capacity of cabinets, which cool the second group of the physical host machines of the distributed computer system, is allowed to be used.

6. The method of claim 1, wherein identifying an unproductive group of guest VMs comprises, for each of the guest VMs:
adding the guest VM to the unproductive group if the guest VM does not use at least a threshold amount of resources of the physical host machine to provide the guest VM.

7. The method of claim 1, wherein identifying an unproductive group of guest VMs comprises, for each of the guest VMs:
determining a productivity metric for the guest VM based on resources of the physical host machine that are used to provide the guest VM;
determining, based on the productivity metric for the guest VM, an infrastructure value that indicates how much infrastructure of the distributed computing system is attributed to providing the guest VM; and
adding the guest VM to the unproductive group if the infrastructure value does not satisfy a defined utilization rule for using at least a threshold amount of infrastructure of the physical host machine.

8. The method of claim 1, wherein identifying an unproductive group of guest VMs comprises, for each of the guest VMs:
adding the guest VM to the unproductive group if the guest VM does not satisfy a defined user relevance rule for providing at least a threshold level of client service to users.

9. A resource management node comprising:
a processor; and
a memory coupled to the processor and comprising computer readable program code that when executed by the processor causes the processor to perform operations comprising:
identifying an unproductive group of guest virtual machines (VMs) that satisfy a defined rule for being unproductive on a first group of physical host machines based on infrastructure of a distributed computing system used by the physical host machines to host the guest VMs, wherein the identifying comprises:
for each of a plurality of the guest VMs determining a productivity metric for the guest VM based on infrastructure resources of the distributed computing system that are used by execution of the guest VM on the physical host machine, and controlling a time window over which the productive metric is measured based on an elapsed time needed for the physical host machine to transition from start-up to being ready to execute the guest VM and based on observed change in number of VM guests being executed by the physical host machines over a defined time, including increasing the time window over which the productivity metric is measured responsive to a slower start-up indicated by a longer elapsed time and shortening the time window over which the productivity metric is measured responsive to an increase in the number of VM guests being executed by the physical host machines over the defined time; and
adding to the unproductive group any of the guest VMs having a productivity metric that does not satisfy a defined utilization rule;
generating a relocation scenario for relocating the unproductive group of the guest VMs from the first group of the physical host machines to a second group of physical host machines to change utilization of the first group of the physical host machines and change utilization of the second group of the physical host machines;
estimating an effect of the relocation scenario on how much infrastructure of the distributed computing system would be used by the first group of the physical host machines and the second group of the physical host machines if the relocation scenario is performed to relocate the unproductive group of the guest VMs from the first group of the physical host machines to the second group of the physical host machines; and
responsive to the estimate of the effect of the relocation scenario on how much infrastructure of the distributed computing system would be used satisfying a defined rule, relocating the unproductive group of the guest VMs from the first group of the physical host machines to the second group of the physical host machines by performing the relocation scenario.

10. The resource management node of claim 9,
wherein estimating an effect of the relocation scenario on how much infrastructure of the distributed computing system would be used, comprises estimating electrical power consumption of the distributed computing system that will be decreased if the first group of the physical host machines is decommissioned and electrical power consumption by the second group of the physical host machines is increased by processing the unproductive group of the guest VMs; and
the relocating the unproductive group of the guest VMs from the first group of the physical host machines to the second group of the physical host machines by performing the relocation scenario, is initiated based on the estimate of the electrical power consumption of the distributed computing system decreasing a threshold amount relative to a present electrical power consumption of the distributed computing system.

11. The resource management node of claim 9, the operations further comprising:
recursively performing the generating a relocation scenario and the estimating an effect of the relocation scenario on how much infrastructure of the distributed computing system would be used until one of relocation scenarios satisfies a defined rule for how much infrastructure of the distributed computing system is allowed to be used.

12. The resource management node of claim 9, wherein the operations further comprise:
relocating the unproductive group of the guest VMs from the first group of the physical host machines to the second group of the physical host machines by performing the one of the relocation scenarios responsive to determining that the one of the relocation scenarios when completed will satisfy a defined rule for how much electrical power capacity of cabinets, which supply power to the second group of the physical host machines of the distribute computing system, is allowed to be used.

13. The resource management node of claim 9, wherein identifying an unproductive group of guest VMs comprises, for each of the guest VMs:
adding the guest VM to the unproductive group if the guest VM does not satisfy a defined user relevance rule for providing at least a threshold level of client service to users.

14. A computer program product comprising:
a non-transitory computer readable storage medium having computer readable program code embodied in the medium, the computer readable program code comprising:
computer readable code to identify an unproductive group of guest virtual machines (VMs) that satisfy a defined rule for being unproductive on a first group of physical host machines based on infrastructure of a distributed computing system used by the first group of the physical host machines to host the guest VMs,
wherein the identifying comprises:
for each of a plurality of the guest VMs determining a productivity metric for the guest VM based on infrastructure resources of the distributed computing system that are used by execution of the guest VM on the physical host machine, and controlling a time window over which the productive metric is measured based on an elapsed time needed for the physical host machine to transition from start-up to being ready to execute the guest VM and based on observed change in number of VM guests being executed by the physical host machines over a defined time, including increasing the time window over which the productivity metric is measured responsive to a slower start-up indicated by a longer elapsed time and shortening the time window over which the productivity metric is measured responsive to an increase in the number of VM guests being executed by the physical host machines over the defined time; and
adding to the unproductive group any of the guest VMs having a productivity metric that does not satisfy a defined utilization rule;
computer readable code to generate a relocation scenario for relocating the unproductive group of the guest VMs from the first group of the physical host machines to a second group of the physical host machines to change utilization of the first group of the physical host machines and change utilization of the second group of the physical host machines;
computer readable code to estimate an effect of the relocation scenario on how much infrastructure of the distributed computing system would be used by the first group of the physical host machines and the second group of the physical host machines if the relocation scenario is performed to relocate the unproductive group of the guest VMs from the first group of the physical host machines to the second group of the physical host machines; and
computer readable code to, responsive to the estimate of the effect of the relocation scenario on how much infrastructure of the distributed computing system would be used satisfying a defined rule, relocate the unproductive group of the guest VMs from the lint group of the physical host machines to the second group of the physical host machines by performing the relocation scenario.

\* \* \* \* \*